(12) United States Patent
Sabharwal et al.

(10) Patent No.: US 11,847,614 B2
(45) Date of Patent: Dec. 19, 2023

(54) METHOD AND SYSTEM FOR DETERMINING COLLABORATION BETWEEN EMPLOYEES USING ARTIFICIAL INTELLIGENCE (AI)

(71) Applicant: HCL Technologies Limited, New Delhi (IN)

(72) Inventors: Navin Sabharwal, New Delhi (IN); Amit Agrawal, Mathura (IN)

(73) Assignee: HCL Technologies Limited, Delhi (IN)

( * ) Notice: Subject to any disclaimer, the term of this patent is extended or adjusted under 35 U.S.C. 154(b) by 308 days.

(21) Appl. No.: 17/199,829

(22) Filed: Mar. 12, 2021

(65) Prior Publication Data

US 2022/0292459 A1  Sep. 15, 2022

(51) Int. Cl.
*G06Q 10/10* (2023.01)
*G06Q 10/0639* (2023.01)
*G06N 20/00* (2019.01)

(52) U.S. Cl.
CPC .......... *G06Q 10/103* (2013.01); *G06N 20/00* (2019.01); *G06Q 10/06398* (2013.01)

(58) Field of Classification Search
CPC . G06Q 10/06398; G06Q 10/103; G06N 20/00
See application file for complete search history.

(56) References Cited

U.S. PATENT DOCUMENTS

| | | | |
|---|---|---|---|
| 6,615,182 B1 | 9/2003 | Powers et al. | |
| 6,754,874 B1 | 6/2004 | Richman | |
| 7,069,266 B2 | 6/2006 | Calderaro et al. | |
| 9,779,386 B2 | 10/2017 | Swierz, III et al. | |
| 10,423,916 B1 | 9/2019 | Cohen et al. | |
| 2004/0128189 A1 | 7/2004 | Hirano et al. | |
| 2008/0027783 A1 | 1/2008 | Hughes et al. | |
| 2008/0114608 A1 | 5/2008 | Bastien | |

(Continued)

FOREIGN PATENT DOCUMENTS

| | | | | |
|---|---|---|---|---|
| KR | 102153012 B1 | | 9/2020 | |
| WO | WO-2022103976 A1 | * | 5/2022 | ....... G06Q 10/06398 |

OTHER PUBLICATIONS

Lyu, Yecheng, et al. "Treernn: Topology-preserving deep graph embedding and learning." 2020 25th International Conference on Pattern Recognition (ICPR). IEEE, 2021. (Year: 2021).*

(Continued)

*Primary Examiner* — Lynda Jasmin
*Assistant Examiner* — Brendan S O'Shea

(57) ABSTRACT

A method and system for determining collaboration between employees is disclosed. In some embodiments, the method includes receiving a plurality of collaboration parameters associated with a set of employees. The method further includes creating a plurality of employee nodes associated with the set of employees in a hierarchical tree, based on the plurality of collaboration parameters and a first pre-trained machine learning model. The method further includes generating a plurality of vector embeddings associated with the plurality of employee nodes, based on the first pre-trained machine learning model. The method further includes determining a degree of collaboration between at least two employees from the set of employees based on one or more vector embeddings from the generated plurality of embeddings.

17 Claims, 16 Drawing Sheets

(56) References Cited

U.S. PATENT DOCUMENTS

| | | | |
|---|---|---|---|
| 2010/0121685 A1 | 5/2010 | Mahadevan et al. | |
| 2015/0371172 A1 | 12/2015 | Minter | |
| 2015/0379453 A1 | 12/2015 | Myers | |
| 2017/0236081 A1 | 8/2017 | Grady Smith et al. | |
| 2020/0160271 A1* | 5/2020 | Nielsen | G06Q 10/1095 |
| 2021/0004748 A1* | 1/2021 | Ravi | G06Q 10/101 |
| 2022/0100720 A1* | 3/2022 | Dhama | G06F 18/2323 |

OTHER PUBLICATIONS

Browntree, Jason "A Gentle Introduction to Transfer Learning for Deep Learning" Machined Learning Mastery, Sep. 16, 2019; avilable at: https://machinelearningmastery.com/transfer-learning-for-deep-learning/ (Year: 2019).*

Sapienza, Anna, Palash Goyal, and Emilio Ferrara. "Deep neural networks for optimal team composition." Frontiers in big Data 2 (2019): 14. (Year: 2019).*

Aishwarya Sinha Ray, "AI in performance management".

Gui, Xin, "Performance appraisal of business administration based on artificial intelligence and convolutional neural network".

* cited by examiner

| S.No. 1002a | Employee ID 1004a | Other member ID 1006a | Employee's skillset 1008a | Employee Roles 1010a | Complexity of Collaboration 1012a | Employees Rating 1014a | Collaboration Satisfaction 1016a |
|---|---|---|---|---|---|---|---|
| 1 | E1 | E4 | Python, Dynamic Programmin g, MS SQL Database | Senior Developer | High | Excellent Performer | 4 |
| 2 | E2 | E8 | Java, Machine Learning | Developer | Medium | Good Performer | 4 |
| 3 | E3 | E9 | Python, Natural Language Processing | Data Scientist | High | Excellent Performer | 5 |

| S.No. 1002b | Employee ID 1004b | Other Member ID 1006b | T1 | T2 | T3 | T4 | T5 | D1 | D2 | D3 | Complexity of Collaboration 1012b | Employee Rating 1014b | Employee Collaboration Satisfaction 1016b |
|---|---|---|---|---|---|---|---|---|---|---|---|---|---|
| 1 | E1 | E4 | 1 | 0 | 0 | 1 | 1 | 1 | 0 | 0 | 3 | 5 | 4 |
| 2 | E2 | E8 | 0 | 1 | 1 | 0 | 0 | 0 | 1 | 0 | 2 | 4 | 4 |
| 3 | E3 | E9 | 1 | 0 | 1 | 0 | 0 | 0 | 0 | 1 | 1 | 5 | 5 |

FIG. 10B

| S.No. 1002c | Employee Rating 1004c | Employee ID 1006c | Number of successful Collaboration 1008c |
|---|---|---|---|
| 1 | Excellent Performer | E1 | 0 |
| 2 | Good Performer | E2 | 2 |
| 3 | Excellent Performer | E3 | 1 |

FIG. 10C

METHOD AND SYSTEM FOR DETERMINING COLLABORATION BETWEEN EMPLOYEES USING ARTIFICIAL INTELLIGENCE (AI)

TECHNICAL FIELD

Generally, the disclosure relates to Artificial Intelligence (AI). More specifically, the disclosure relates to a method and system for determining collaboration between employees using AI.

BACKGROUND

Generally, every organization may be an integration of numerous departments or teams collaborating together to ensure that organization goals are met smoothly. With collaboration, employees of same teams or different teams may work at their full potential. Therefore, management and efficient use of resources may be crucial for smooth functioning of every organization. However, tracking of different aspects related to the employees for the collaboration may be a tedious task, especially when the employees have concurrent tasks or when the employees work on multiple projects simultaneously. As a result, managing the resources for collaboration amongst employees may be time consuming and an inefficient process, especially for large organizations. Inefficient utilization of the resources at hand may lead to compromise in profits of the organization. In certain scenarios, managing the resources manually may lead to the risk of mistakes.

Accordingly, there is a need for a robust, streamlined and efficient method and system to determine the collaboration between the employees of the organization.

SUMMARY OF INVENTION

In one embodiment, a method of determining collaboration between employees is disclosed. The method may include receiving a plurality of collaboration parameters associated with a set of employees. The method may further include creating a plurality of employee nodes associated with the set of employees in a hierarchical tree, based on the plurality of collaboration parameters and a first pre-trained machine learning model. It should be noted that, the hierarchical tree further comprises a plurality of edges and each of the plurality of edges interconnects at least two of the set of employee nodes. The method may further include generating a plurality of vector embeddings associated with the plurality of employee nodes, based on the first pre-trained machine learning model. The method may further include determining a degree of collaboration between at least two employees from the set of employees based on one or more vector embeddings from the generated plurality of embeddings. It should be noted that, the degree of collaboration corresponds to association between the at least two employees.

In another embodiment, a system for determining collaboration between employees is disclosed. The system includes a processor and a memory communicatively coupled to the processor. The memory may store processor-executable instructions, which, on execution, may causes the processor to receive a plurality of collaboration parameters associated with a set of employees. The processor-executable instructions, on execution, may further cause the processor to create a plurality of employee nodes associated with the set of employees in a hierarchical tree, based on the plurality of collaboration parameters and a first pre-trained machine learning model. It should be noted that, the hierarchical tree further comprises a plurality of edges and each of the plurality of edges interconnects at least two of the set of employee nodes. The processor-executable instructions, on execution, may further cause the processor to generate a plurality of vector embeddings associated with the plurality of employee nodes, based on the first pre-trained machine learning model. The processor-executable instructions, on execution, may further cause the processor to determine a degree of collaboration between at least two employees from the set of employees based on one or more vector embeddings from the generated plurality of embeddings. It should be noted that, the degree of collaboration corresponds to association between the at least two employees.

In yet another embodiment, a non-transitory computer-readable medium storing computer-executable instruction for determining collaboration between employees is disclosed. The stored instructions, when executed by a processor, may cause the processor to perform operations including receiving a plurality of collaboration parameters associated with a set of employees. The operations may further include creating a plurality of employee nodes associated with the set of employees in a hierarchical tree, based on the plurality of collaboration parameters and a first pre-trained machine learning model. It should be noted that, the hierarchical tree further comprises a plurality of edges and each of the plurality of edges interconnects at least two of the set of employee nodes. The operations may further include generating a plurality of vector embeddings associated with the plurality of employee nodes, based on the first pre-trained machine learning model. The operations may further include determining a degree of collaboration between at least two employees from the set of employees based on one or more vector embeddings from the generated plurality of embeddings. It should be noted that, the degree of collaboration corresponds to association between the at least two employees.

It is to be understood that both the foregoing general description and the following detailed description are exemplary and explanatory only and are not restrictive of the invention, as claimed.

BRIEF DESCRIPTION OF THE DRAWINGS

The present disclosure can be best understood by reference to the following description taken in conjunction with the accompanying drawing figures, in which like parts may be referred to by like numerals

FIGS. 10A-10C illustrates a tabular representation for input data corresponding to collaboration parameters associated with employees, in accordance with an exemplary embodiment.

DETAILED DESCRIPTION OF THE DRAWINGS

Figure 1:
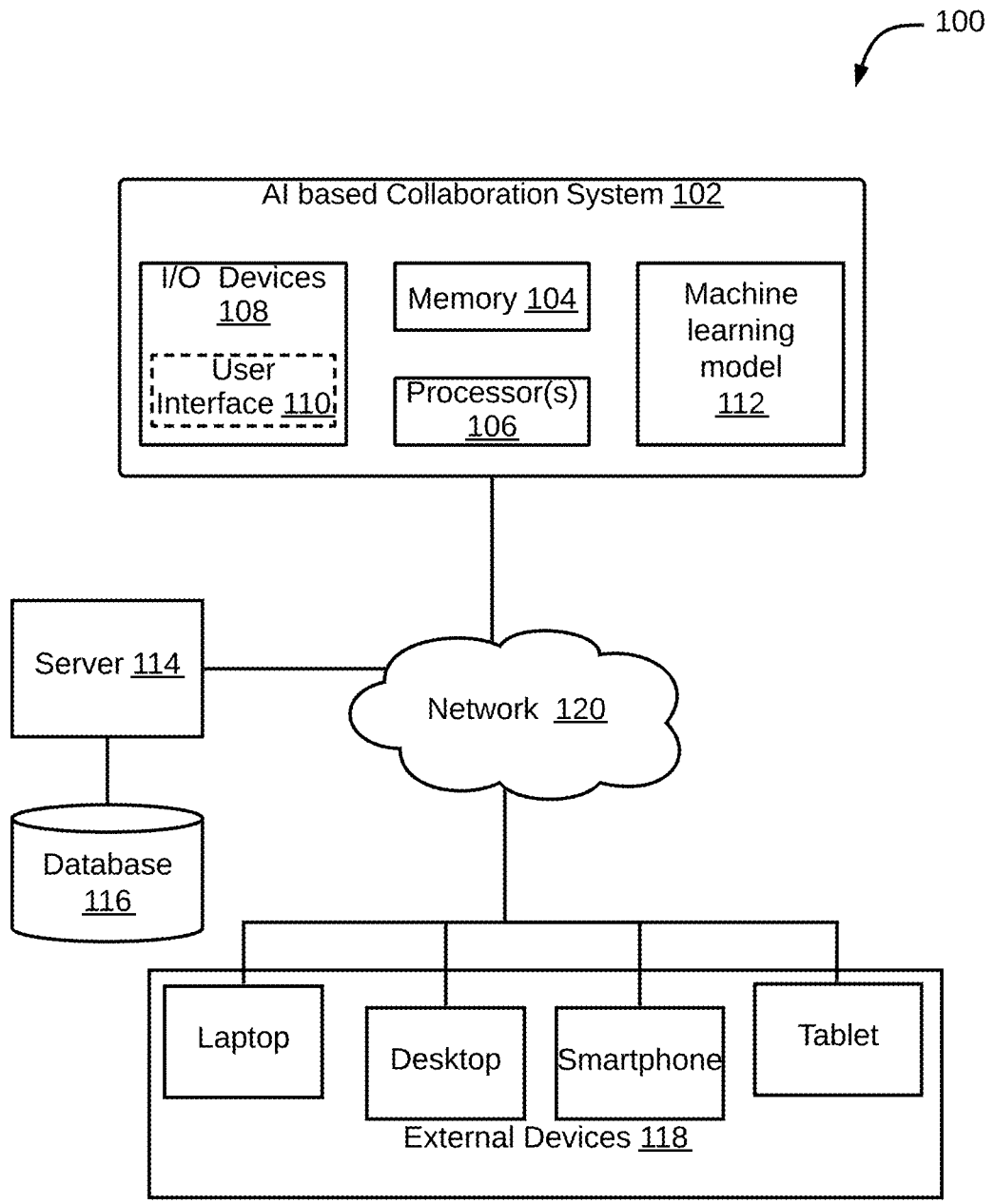
FIG. 1 illustrates a functional block diagram of an Artificial Intelligence (AI) based collaboration system for determining collaboration between employees, in accordance with an embodiment.

The following description is presented to enable a person of ordinary skill in the art to make and use the disclosure and is provided in the context of particular applications and their requirements. Various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art will realize that the disclosure might be practiced without the use of these specific details. In other instances, well-known structures and devices are shown in block diagram form in order not to obscure the description of the disclosure with unnecessary detail. Thus, the disclosure is not intended to be limited to the embodiments shown, but is to be accorded the widest scope consistent with the principles and features disclosed herein.

While the disclosure is described in terms of particular examples and illustrative figures, those of ordinary skill in the art will recognize that the disclosure is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hardwired logic. (The term "logic" herein refers to fixed hardware, programmable logic and/or an appropriate combination thereof, as would be recognized by one skilled in the art to carry out the recited functions). Software and firmware can be stored on computer-readable storage media. Some other processes can be implemented using analog circuitry, as is well known to one of ordinary skill in the art. Additionally, memory or other storage, as well as communication components, may be employed in embodiments of the invention.

The present disclosure tackles limitations of existing systems to facilitate determination of collaboration between employees working in a same organization. As will be appreciated, the employees may be working in a same team or different teams of an organization. In order to facilitate determination of collaborations between employees, the present disclosure introduces an AI based collaboration system. In order to determine the collaboration between employees, the present disclosure may determine a degree of collaboration between at least two employees from a set of employees. The degree of collaboration may be determined based on one or more vector embeddings from a generated plurality of embeddings. In an embodiment, the degree of collaboration may correspond to association between the at least two employees. In addition, the plurality of vector embeddings may include extracting one or more set of edges initiating from a root node of a plurality of the employee nodes and culminating at an associated leaf node of the plurality of the employee nodes in a hierarchical tree.

Moreover, the present disclosure may determine the degree of collaboration between at least two employees based on a plurality of collaboration parameters associated with each of the set of employees. The plurality of collaboration parameter may include, but is not limited to, at least one or more of employee skillset, employee role, employee rating, collaboration complexity, and collaboration satisfaction. Further, the present disclosure may facilitate computation of score for each of the set of employees in order to facilitate ranking of each of the set of employees working in the organization.

In an embodiment, the present disclosure may train the AI based collaboration system by exposing to a new environment during initial training process. The AI based collaboration system may utilize an active learning algorithm. Based on the active learning algorithm, the AI based system may determine collaboration satisfaction among employees in order to determine a degree of collaboration between at least two employees from the set of employees. For this, the AI based collaboration system may identify one or more first employees and one or more second employees from the set of employees. In an embodiment, the one or more first employees may correspond to employees may employees providing assistance to one or more of the set of employees. In addition, the one or more second employees may correspond to employees receiving assistance from one or more of the set of employees. Further, based on identifications of the one or more first employees and the one or more second employees a feedback may be generated. Thereafter, based on the generated feedback the AI based collaboration system may evaluate performance of each of the set of employees. This has been explained in detail in conjunction to FIG. 1 to FIG. 13.

Referring now to FIG. 1, a functional block diagram for a network 100 of an AI based collaboration system for determining collaboration between employees is illustrated, in accordance with an embodiment. With reference to FIG. 1, there is shown an AI based collaboration system 102 that includes a memory 104, a processor(s) 106, I/O devices 108 and a machine learning (ML) model 112. The I/O devices 108 of the AI based collaboration system 102 may further include an I/O interface 110. Further, in the network environment 100, there is shown a server 114, a database 116, external devices 118 and a communication network 120 (hereinafter referred as network 120).

The AI based collaboration system 102 may be communicatively coupled to the server 114, and the external devices 118, via the network 120. Further, the AI based collaboration system 102 may be communicatively coupled to the database 116 of the server 114, via the network 120. A user or an administrator (not shown in the FIG. 1) may interact with the AI based collaboration system 102 via the user interface 110 of the I/O device 108.

The AI based collaboration system 102 may include suitable logic, circuitry, interfaces, and/or code that may be configured to determine collaboration between employees of an organization, based on a plurality of collaboration parameters associated with the employees. Such employees may be from a same team or a different team in the organization and working at different levels of a hierarchy in the organization. The plurality of collaboration parameter may include, but is not limited to, at least one or more of employee skillset, employee role, employee rating, collaboration complexity, and collaboration satisfaction. The AI based collaboration system 102 may correspond to a tree based hierarchical collaboration system.

AI based collaboration framework associated with the AI based collaboration system 102 may be implemented on but are not limited to, a server, a desktop, a laptop, a notebook, a tablet, a smartphone, a mobile phone, an application server, or the like. By way of an example, the AI based collaboration system 102 may be implemented as a plurality of distributed cloud-based resources by use of several technologies that are well known to those skilled in the art. Other examples of implementation of the AI based collaboration system 102 may include, but are not limited to, a web/cloud server and a media server.

The I/O devices 108 may be configured to provide inputs to the AI based collaboration system 102 and render output on user equipment. In an embodiment, the user equipment, may correspond to the external devices 118. By way of an example, the user may provide inputs, i.e., the plurality of collaboration parameters via the I/O devices 108 by using the user interface 110. In addition, the I/O devices 108 may be configured to render information associated with ranks of the employees computed for each of the set of employees by the AI based collaboration system 102.

Further, the I/O device 108 may be configured to display results (i.e., a degree of collaboration between at least two employees from the set of employees) generated by the AI based collaboration system 102, to the user. By way of another example, the user interface 110 may be configured by the user to provide inputs to the AI based collaboration system 102. Thus, for example, in some embodiment, the AI based collaboration system 102 may ingest the plurality of collaboration parameters via the user interface 110. Further, for example, in some embodiments, the AI based collaboration system 102 may render intermediate results (e.g., a score computed for each of the set of employees, and a feedback generated for each of the set of employees) or final results (e.g., the degree of collaboration between at least two employees, and results of evaluation performed for each of the set of employees) to the user via the user interface 110.

The memory 104 may store instructions that, when executed by the processor 106, may cause the processor 106 to determine collaboration between employees. The processor 106 may determine the collaboration between each of the set of employees based on the plurality of collaboration parameters associated with each of the set of employees, in accordance with some embodiments. As will be described in greater detail in conjunction with FIG. 2 to FIG. 13, in order to determine collaboration between each of the set of employees, the processor 106 in conjunction with the memory 104 may perform various functions including creation of a plurality of employee nodes associated with the set of employees, generation of a plurality of vector embeddings associated with the plurality of employee nodes, and computation of score associated with each of the set of employees, and identification of one or more first employees and one or more second employees for each of the set of employees.

The memory 104 also store various data (e.g., a plurality of collaboration parameters, the plurality of vector embeddings, the degree of collaboration, the computed score, and ranks associated with each of the set of employees) that may be captured, processed, and/or required by the AI based collaboration system 102. The memory 104 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random-Access Memory (DRAM), Static Random-Access memory (SRAM), etc.).

In accordance with an embodiment, the AI based collaboration system 102 may be configured to deploy the ML model 112 to use output of the ML model 112 to generate real or near-real time inferences, take decisions, or output prediction results. The ML model 112 may be deployed on the AI based collaboration system 102, once the ML model 112 is trained on the AI based collaboration system 102 for determining the degree of collaboration between at least two employees from the set of employees.

In accordance with one embodiment, the ML model 112 may correspond to a first pre-trained machine learning model. In accordance with an embodiment, the first pre-trained machine learning model may correspond to a graph neural network model that may be used by the AI based collaboration system 102 to determine the degree of collaboration between at least two employees from the set of employees. Examples of the graph neural network model includes, but not limited to, Long Short-Term Memory (LSTM), LSTM-GRU (Long Short-Term Memory-Gated Recurrent Units) of Neural Network.

The ML model 112 may be configured to create the plurality of employee nodes. The ML model 112 may create the plurality of employee nodes in order to assist the AI based collaboration system 102 to generate a plurality of vector embeddings. In accordance with another embodiment, the ML model 112 may correspond to a second machine learning model (such as, a Rank-Net model). The ML model 112 may be trained to determine collaboration satisfaction between each of the set of employees. In an embodiment, the collaboration satisfaction may correspond to one of a successful collaboration and an unsuccessful collaboration between at least two employees from the set of employees.

Further, the AI based collaboration system 102 may interact with the server 114 or the external device 118 over the network 120 for sending and receiving various types of data. The external device 118 may include, but not be limited to a desktop, a laptop, a notebook, a netbook, a tablet, a smartphone, a remote server, a mobile phone, or another computing system/device.

The network 120, for example, may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

In some embodiments, the AI based collaboration system 102 may fetch information associated with each of the set of employees from the server 114, via the network 120. The database 116 may store information associated with existing technologies or the new technology in demand.

In operation, the AI based collaboration system 102 may be configured to receive the plurality of collaboration parameters associated with the set of employees. The AI based collaboration system 102 may be further configured to create the plurality of employee nodes associated with the set of employees in the hierarchical tree. In an embodiment, the hierarchical tree may include a plurality of edges. In addition, each of the plurality of edges may interconnect at least two of the set of employee nodes. Further, the AI based collaboration system 102 may generate the plurality of vector embeddings associated with the plurality of employee nodes. The AI based collaboration system 102 may then determine the degree of collaboration between at least two employees from the set of employees. In order to determine the degree of collaboration, the AI based collaboration system 102 may compute the score for each of the set of employees based on the identified collaboration satisfaction. Thereafter, the AI based collaboration system 102 may rank each of the set of employees based on the associated computed score. In addition, the AI based collaboration system 102 may generate a feedback for each of the set of employees. Based on the generated feedback, the AI based collaboration system 102 may evaluate performance of each of the set of employees. This is further explained in detail in conjunction with FIG. 2 to FIG. 13.

Figure 2:
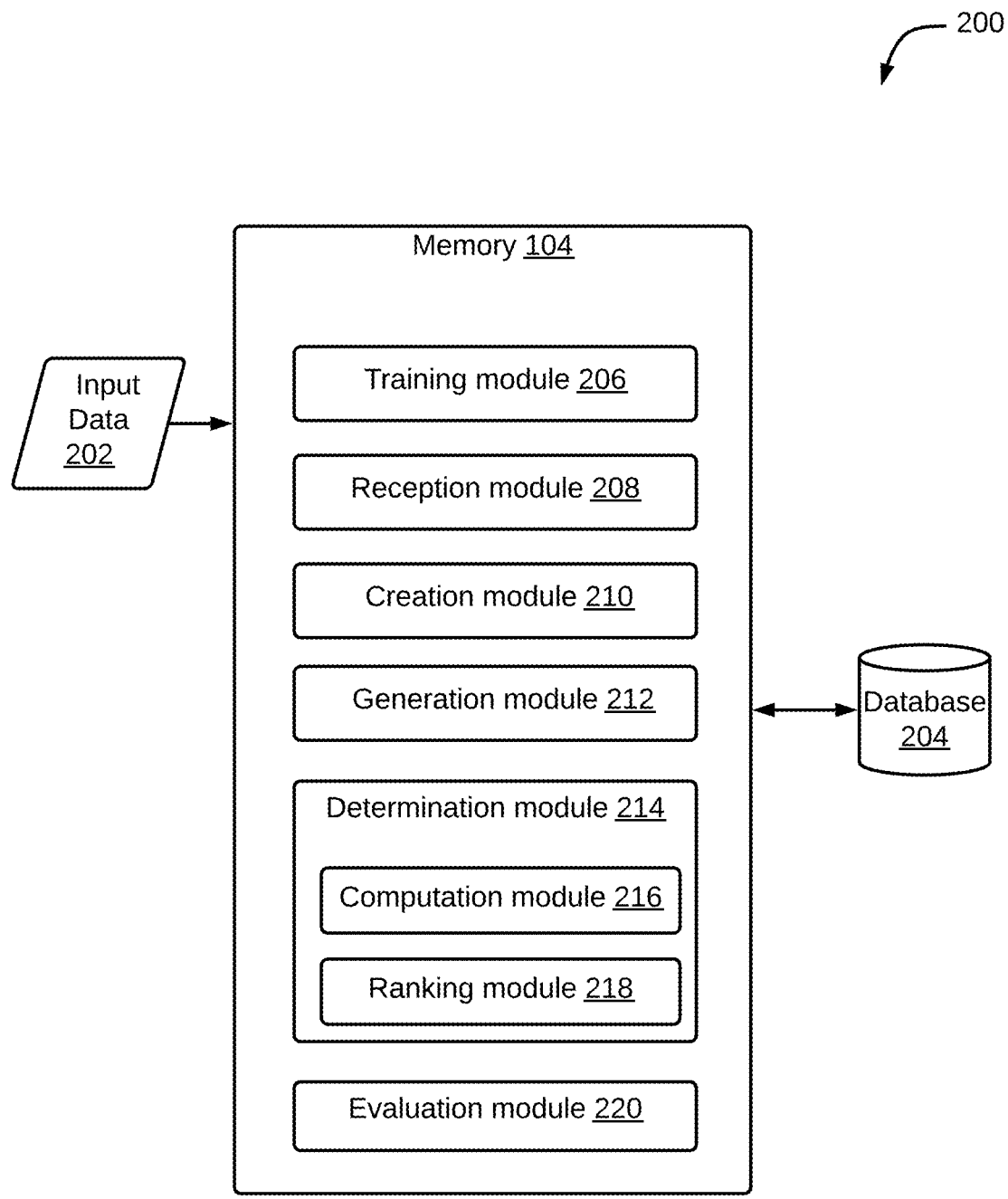
FIG. 2 illustrates a functional block diagram of various modules within a memory of an AI based collaboration system for determining collaboration between employees, in accordance with an embodiment.

Referring now to FIG. 2, a functional block diagram of various modules within a memory of an AI based collaboration system for determining collaboration between employees is illustrated, in accordance with an embodiment of the present disclosure. FIG. 2 is explained in conjunction with FIG. 1.

With reference to FIG. 2, there is shown input data 202, a database 204 coupled with the memory 104. The memory 104 may include a training module 206, a reception module 208, a creation module 210, a generation module 212, a determination module 214, and an evaluation module 220. The determination module 214 may further include a computing module 216, and a ranking module 216. The modules 206-220 may include routines, programs, objects, components, data structures, etc., which perform particular tasks or implement particular abstract data types. The modules 206-220 described herein may be implemented as software modules that may be executed in a cloud-based computing environment of the AI based collaboration system 102.

In accordance with an embodiment, the memory 104 may be configured to receive the input data 202. The input data 202 may correspond to data associated with a plurality of collaboration parameters associated with a set of employees. In an embodiment, the plurality of collaboration parameters may include, but is not limited to, at least one or more of employee skillset, employee role, employee rating, collaboration complexity, and collaboration satisfaction. The memory 104 may be configured to receive the input data 202 in the database 204 from the external device 118. Additionally, the input data 202 may include information associated with the set of employees.

The database 204 may serve as a repository for storing data processed, received, and generated by the modules 206-220. The data generated as a result of the execution of the modules 206-220 may be stored in the database 204.

In conjunction to FIG. 1, the training module 204 may be configured to train the ML model 112. It should be noted that, the ML model 112 may correspond to each of a first pre-trained machine learning model, a second pre-trained ML model, and a third pre-trained ML model. Based on training, the training module 204 may assist the creation module 210 in creation of a plurality of employee nodes associated with each of the set of employees. Once the plurality of employee nodes is created, the training module 204 may assist the generation module 212 to generate the plurality of vector embedding associated with the plurality of employee nodes.

In an embodiment, the plurality of employee nodes and the plurality of vector embedding may be generated based on the first pre-trained machine learning model. In addition, the training module 204 may assist the generation module 212 to generate one or more second vector embeddings of the plurality of vector embeddings. In an embodiment, one or more second vector embeddings may be generated based on the third pre-trained machine learning model. Further, the training module 204 may be configured to work with the computation module 216 for computing a score corresponding to each of the set of employees. In an embodiment, the score may be computed based on the second pre-trained machine learning model.

During operation, the reception module 208 may be configured to receive the plurality of collaboration parameters associated with each of the set of employees as the input data 202. In one embodiment, the reception module 208 may directly receive each of the plurality of collaboration parameters from the external devices 118. In another embodiment, the reception module 208 may fetch the plurality of collaboration parameters from the database 204. The plurality of collaboration parameters associated with the set of employees may include, but is not limited to at least one or more of employee skillset, employee role, employee rating, collaboration complexity, and collaboration satisfaction.

In an embodiment, collaboration complexity may represent level of collaboration or assistance provided by an employee to another employee of an organization. Further, the collaboration complexity may take any values from Low, Medium, and High. In addition, the collaboration complexity may take any other ordinal values that shows order from lowest to highest. Moreover, the employee rating associated with each of the set of employees may represent rating of an employee providing an assistance to another employee of same or different team. In an embodiment, employee rating associated with the employee may be positively impacted when the employee provides an assistance to another employee. Similarly, the employee rating associated with the employee may be negatively impacted when the employee receives an assistance from another employee of the organization.

The plurality of collaboration parameters may correspond to tabular data shown in FIG. 10A. Such tabular data corresponding to the plurality of collaboration parameters may reflect ordinal values of the plurality of collaboration parameters. The reception module 206 may be configured to pre-process the input data 202 associated with the plurality of collaboration parameters having ordinal values into numerical values. For example, the collaboration parameter corresponding to collaboration complexity associated with each of the set of employees may be high, medium and low value that is converted to 1, 2 and 3 respectively by the reception module 206, as represented in FIG. 10B. Further, in another example, the employee rating associated with each of the set of employees may take any values between 1 to 5. In accordance with an embodiment, the value 1 may represent lowest rating and 5 may represent highest rating. The rating may be provided based on the assistance received or provided by at least one employee from the set of employees. Moreover, in some embodiments, definition of lowest and highest may be different for employee rating.

In accordance with an embodiment, the input data 202 of the plurality of collaboration parameters with ordinal values may be converted into a passable format for a first pre-trained machine learning model by using one hot representation for the input data 202. The one hot representation (also known as one hot embedding) may map input data 202 which may be a categorical value data into a Neural Network passable format. Such format may allow to train an embedding layer of the first pre-trained machine learning model for each of the plurality of performance parameters. The input data 202 with one hot representation may be fed to hidden layers of the first pre-trained machine learning model to handle a much smaller size of preprocessed input data as compared to the input data with ordinal values.

Further, the creation module 210 may be configured to create a plurality of employee nodes associated with the set of employees in a hierarchical tree. The hierarchical tree may correspond to a graph that comprises two components, namely, the plurality of employee nodes and plurality of edges. The hierarchical tree may include the plurality of edges that connects the plurality of employee nodes. In accordance with an embodiment, the plurality of edges may be directed to show directional dependencies between the plurality of employee nodes. In accordance with another embodiment, the plurality of edges may be undirected. In accordance with an embodiment, the first pre-trained machine learning model may directly operate on structure of the hierarchical tree.

Further, each of the plurality of edges may interconnect at least two of the set of employee nodes. In accordance with an embodiment, the creation module 210 may create each of the plurality of employee nodes based on the plurality of collaboration parameters and the first pre-trained machine learning model. As will be appreciated, the first pre-trained machine learning model may correspond to any deep neural network model (for example, an attention based deep neural network model and a Convolution Neural Network (CNN) model). Further, the creation module 210 may be configured to transmit the plurality of employee nodes to the generation module 212.

Upon receiving the plurality of employee nodes, the generation module 212 may be configured to generate a plurality of vector embeddings associated with the plurality of employee nodes. In an embodiment, the generation module 212 may generate each of the plurality of vector embeddings based on the first pre-trained machine model. In accordance with an embodiment, the generation module 212 may be configured to extract one or more set of edges initiating from a root node of the plurality of the employee nodes and culminating at an associated leaf node of the plurality of the employee nodes in the hierarchical tree.

In accordance with an embodiment, to find a required team (say, a team specializing in machine learning domain) for collaboration, the generation module 212 may generate one or more first vector embeddings of the plurality of vector embeddings corresponding to one or more first nodes. In addition, the generation module 212 may generate one or more second vector embeddings of the plurality of vector embeddings corresponding to one or more second nodes. The one or more second vector embeddings may be generated by the generation module 212, based on aggregation of the generated one or more first vector embeddings by using a third pre-trained machine learning model. Further, based on the one or more first nodes and the one or more second nodes generated, the generation module 212 may identify a set of linked nodes that correspond to the required team for collaboration.

The AI based collaboration system 102 may provide feedback to each of the set of employees based on collaboration between employees, (such as, at least two employees from the set of employees). The feedback may then be utilized to evaluate performance of each of the set of employees. Therefore, in accordance with an embodiment, the generation module 212 may be configured to generate the feedback for each of the set of employees. In an embodiment, a positive feedback may be generated for one or more first employees. The one or more first employee may correspond to employees providing assistance to one or more of the set of employees. In accordance with an embodiment, a negative feedback may be generated for one or more second employees. The one or more second employees may correspond to employees receiving assistance from one or more of the set of employees.

The plurality of vectors embedding created and the feedback generated may be stored in database 204 for further computation. It may be noted that the process of storing the vector embeddings in the database 204 may continue, until the vector embeddings associated with each of the plurality of employee nodes is generated and stored. The plurality of vector embeddings and the generated feedback stored in the database 204 may further be utilized by the determination module 214.

In one embodiment, the determination module 21 may fetch the plurality of vector embeddings from the database 204. In another embodiment, the determination module 214 may receive each of the plurality of vector embeddings from the generation module 212. Upon receiving the plurality of vector embeddings, the determination module 214 may be configured to determine a degree of collaboration between at least two employees from the set of employees.

In order to determine the degree of collaboration, the computation module 216 of the determination module 214 may be configured to compute a score for each of the set of employees based on collaboration satisfaction. The collaboration satisfaction may correspond to one of a successful collaboration and an unsuccessful collaboration. In an embodiment, the computation module 216 may compute the score using the second pre-trained machine learning model. Example of the second pre-trained machine learning model may include a Rank-Net Neural Network model. Further, the computation module 216 may be configured to transmit the computed score to the ranking module 218. Upon receiving the score computed for each of the set of employees, the ranking module 218 may generate a rank for each of the set of employees based on the computed score associated with each of the set of employees. In an embodiment, the rank may be generated in order to determine the degree of collaboration between the at least two employees from the set of employees.

In one embodiment, the evaluation module 220 may fetch the feedback generated for each of the set of employees from the database 204. In another embodiment, the evaluation module 220 may be configured to receive the feedback generated from the generation module 212. Upon receiving the feedback generated for each of the set of employees, the evaluation module 220 may be configured to evaluate the performance of each of the set of employees.

In particular, as will be appreciated by those of ordinary skill in the art, various modules 206-220 for performing the techniques and steps described herein may be implemented in the AI based collaboration system 102, either by hardware, software, or combinations of hardware and software. For example, suitable code may be accessed and executed by the one or more processors on the AI based collaboration system 102 to perform some or all of the techniques described herein. Similarly, application specific integrated circuits (ASICs) configured to perform some or all of the processes described herein may be included in the one or more processors on the host computing system. Even though FIGS. 1-2 describe about the AI based collaboration system 102, the functionality of the components of the AI based collaboration system 102 may be implemented in any computing devices.

Figure 3:
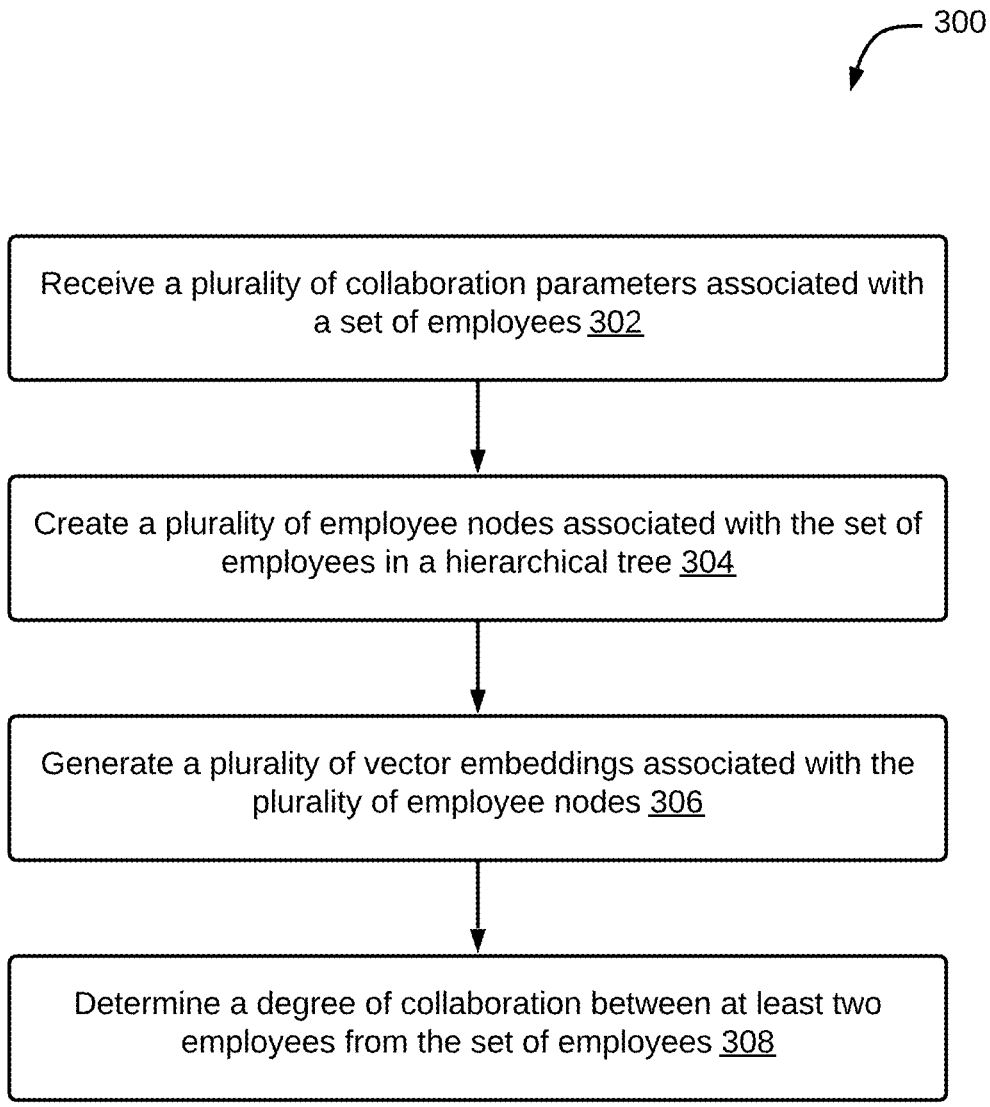
FIG. 3 illustrates a flowchart of a method for determining collaboration between employees, in accordance with an embodiment.

Referring to FIG. 3, a flowchart of a method for determining collaboration between employees is illustrated, in accordance with an embodiment. FIG. 3 is explained in conjunction with FIG. 1 and FIG. 2.

With reference to FIG. 1, the collaboration between employees may be determined based on various entities of network environment 100 (for example, the AI based collaboration system 102, and the server 114). Moreover, various modules depicted within the memory 104 of the AI based collaboration system 102 in FIG. 2, may be configured to perform each of the steps mentioned in the present FIG. 3.

At step 302, a plurality of collaboration parameters may be received. Each of the plurality of collaboration parameters received may be associated with the set of employees. In an embodiment, each employee from the set of employees may working in a same team or a different team of an organization. Further, each of the plurality of collaboration parameters may include, but is not limited, to at least one or more of employee skillset, employee role, employee rating, collaboration complexity, and collaboration satisfaction.

Once the plurality of collaboration parameters is received, at step 304, a plurality of employee nodes may be created associated with each of the set of employees in a hierarchical tree. The hierarchical tree may include a plurality of edges and each of the plurality of edges interconnects at least two of the set of employee nodes. In an embodiment, the plurality of employee nodes may be created based on the collaboration parameters received and a first pre-trained machine learning model. Further, the plurality of employee nodes may correspond to employee data associated with the plurality of collaboration parameters. Moreover, each of the plurality of edges interconnecting the at least two of the set of employee nodes in the hierarchical tree may correspond to relationship between two or more employees of the set of employees of various designations.

With reference to FIG. 1, the proposed AI based collaboration system 102 may be order agnostic and doesn't depend on specific order of values being implemented.

Further, at step 306, a plurality of vector embeddings may be generated. The plurality of vectors embeddings may be generated based on each of the plurality of employee nodes. In an embodiment, each of the plurality of vector embeddings is generated based on the first pre-trained machine learning model. The first pre-trained machine learning model may be trained as part of transfer learning for determining the degree of collaboration between the at least two employees.

The one or more set of edges may initiate from a root node of the plurality of the employee nodes and culminating at an associated leaf node of the plurality of the employee nodes in the hierarchical tree. In an embodiment, the plurality of vector embeddings may be generated based on a graph neural network. Moreover, each of the plurality of vectors embedding generated may be utilized for a plurality of tasks. The plurality of tasks may include identification of an employee from the set of employees with whom collaboration can be done, and as an input for evaluating the performance of each of the set of employees. The process of generating the plurality of vector embeddings has been explained in greater detail in conjunction to FIG. 4.

Thereafter, at step 308, a degree of collaboration may be determined between two employees from the set of employees. The degree of collaboration may be determined based on one or more vector embeddings from the generated plurality of vector embeddings. In an embodiment, the degree of collaboration may correspond to association between the at least two employees. The process of determining the degree of collaboration has been explained in greater detail in conjunction to FIG. 5.

Figure 4:
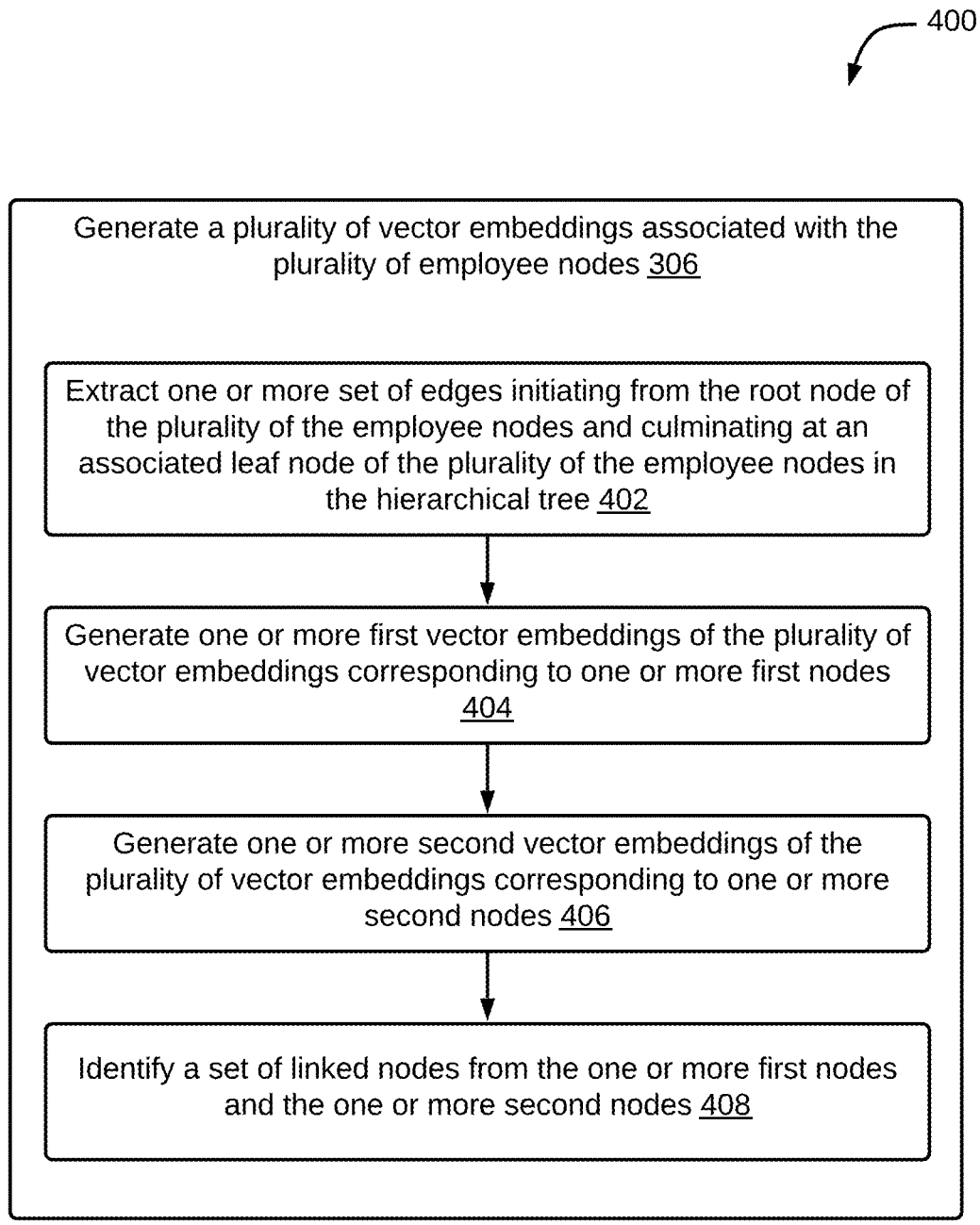
FIG. 4 illustrates a flowchart of a method for generating a plurality of vector embeddings, in accordance with an embodiment.

Referring now to FIG. 4, a flowchart of a method for generating a plurality of vector embeddings is illustrated, in accordance with an embodiment. FIG. 4 is explained in conjunction with FIG. 1 to FIG. 3.

With reference to FIG. 3, in order to generate the plurality of vector embeddings as mentioned in step 306 of FIG. 3, a first pre-trained machine learning model may be used. The first pre-trained machine learning model may correspond to the ML model 112. In an embodiment, the first pre-trained machine learning model may be trained as part of transfer learning to determine the degree of collaboration between the at least two employees. Moreover, the first pre-trained machine learning model may be configured to compute a Q value of each of the set of employees using a reinforcement learning algorithm. In an embodiment, the computed Q-value may correspond to probability of one employee from the set of employees that is preferred over other employees from the set of employees for the collaboration.

In order to generate the plurality of vector embeddings corresponding to each of the plurality of employee nodes, at step 402, one or more set of edges may be extracted from the hierarchical tree. The one or more set of edges extracted may initiate from the root node of the plurality of the employee nodes and culminate at an associated leaf node of the plurality of the employee nodes in the hierarchical tree.

Further, at step 404, one or more first vector embeddings of the plurality of vector embeddings may be generated. The one or more first vector embeddings may be generated corresponding to one or more first nodes of the hierarchical tree.

Once the one or more first vector embeddings are generated, at step 406, one or more second vector embeddings of the plurality of vector embeddings may be generated. The one or more second vector embeddings may be generated corresponding to one or more second nodes of the hierarchical tree. In an embodiment, the one or more second vector embeddings may be generated based on aggregation of the generated one or more first vector embeddings and a third pre-trained machine learning model. The third pre-trained machine learning model may correspond to the ML model 112. It should be noted that, the one or more first nodes may be lower in hierarchy than the one or more second nodes in the hierarchical tree.

Thereafter, at step 408, a set of linked nodes may be identified from the one or more first nodes and the one or more second nodes. In an embodiment, each of the set of linked nodes may correspond to a required team for collaboration. By way of an example, the set of linked nodes may depict collaboration between two employees from the set of employees for a previously developed product in a certain domain. Further, based on the set of linked nodes identified, the team required to collaborate on future projects may be identified. The process of generating the plurality of vector embeddings has been explained via example in conjunction to FIGS. 7A-7B and FIG. 8.

Figure 5:
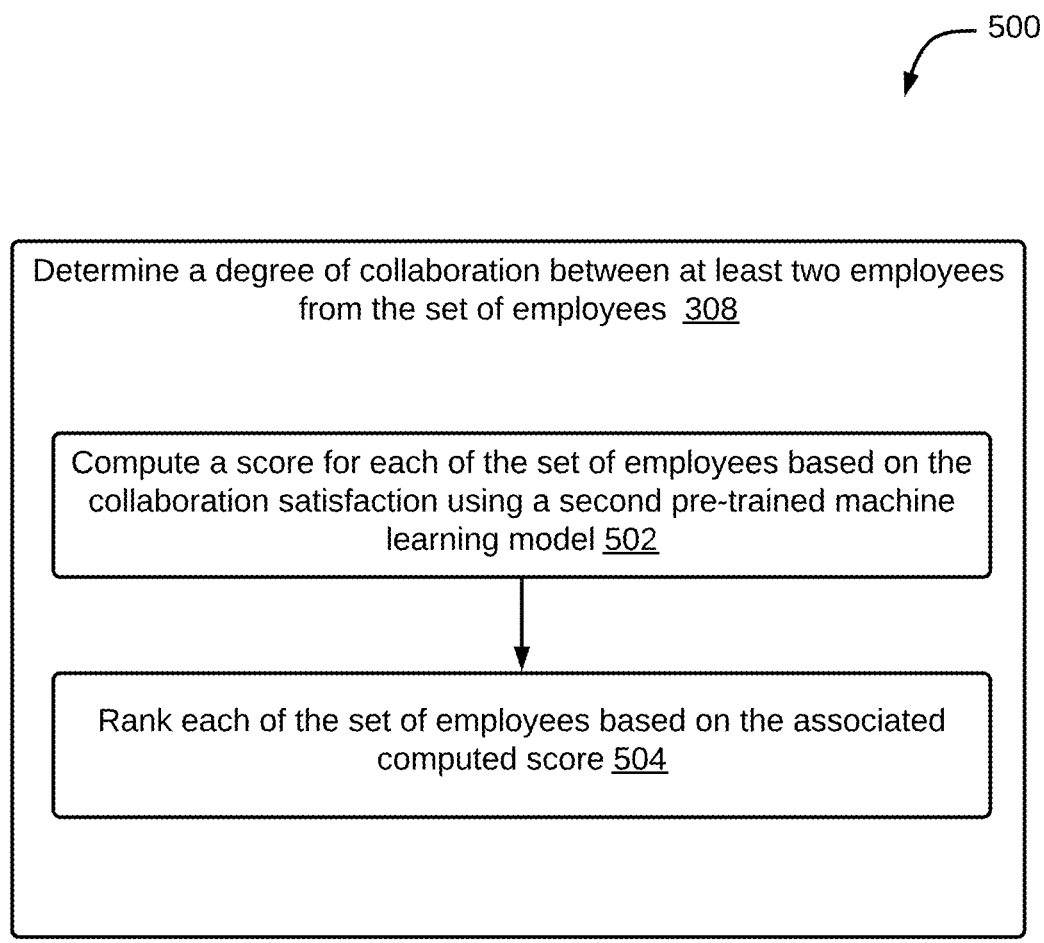
FIG. 5 illustrates a flowchart of a method for determining a degree of collaboration between at least two employees, in accordance with an embodiment.

Referring now to FIG. 5, a flowchart of a method for determining a degree of collaboration between at least two employees is illustrated, in accordance with an embodiment. FIG. 5 is explained in conjunction with FIG. 1 to FIG. 4.

With reference to FIG. 3, in order to determine the degree of collaboration between at least two employees from the set of employees as mentioned in step 308 of FIG. 3, a second pre-trained machine learning model may be used. The second pre-trained machine learning model may correspond to machine learning model 112. In order to determine the degree of collaboration, at step 502, a score corresponding to each of the set of employees may be computed. In an embodiment, the score may be computed based on the collaboration satisfaction among each of two employees from the set of employees using the second pre-trained machine learning model. The collaboration satisfaction may correspond to one of a successful collaboration and an unsuccessful collaboration.

By way of an example, when one employee provides assistance to another employee of a team in completion of a task and the task gets completed successfully based on the assistance provided, then the collaboration between those two employees may correspond to the successful collaboration. Example of the task may correspond to a module or a product developed by an employee. By way of another example, when one employee provides assistance to another employee of a team in completion of the task and the task couldn't get completed based on the assistance provided, then the collaboration between those two employees may correspond to the unsuccessful collaboration. In an embodiment, the successful collaboration may be scored higher than the unsuccessful collaboration.

Once the score corresponding to each of the set of employees is computed, at step 504, a rank may be generated for each of the set of employees. The rank may be generated based on the computed score. Further, based on the rank generated for each of the set of employees, the degree of collaboration between at least two employees may be determined.

Figure 6:
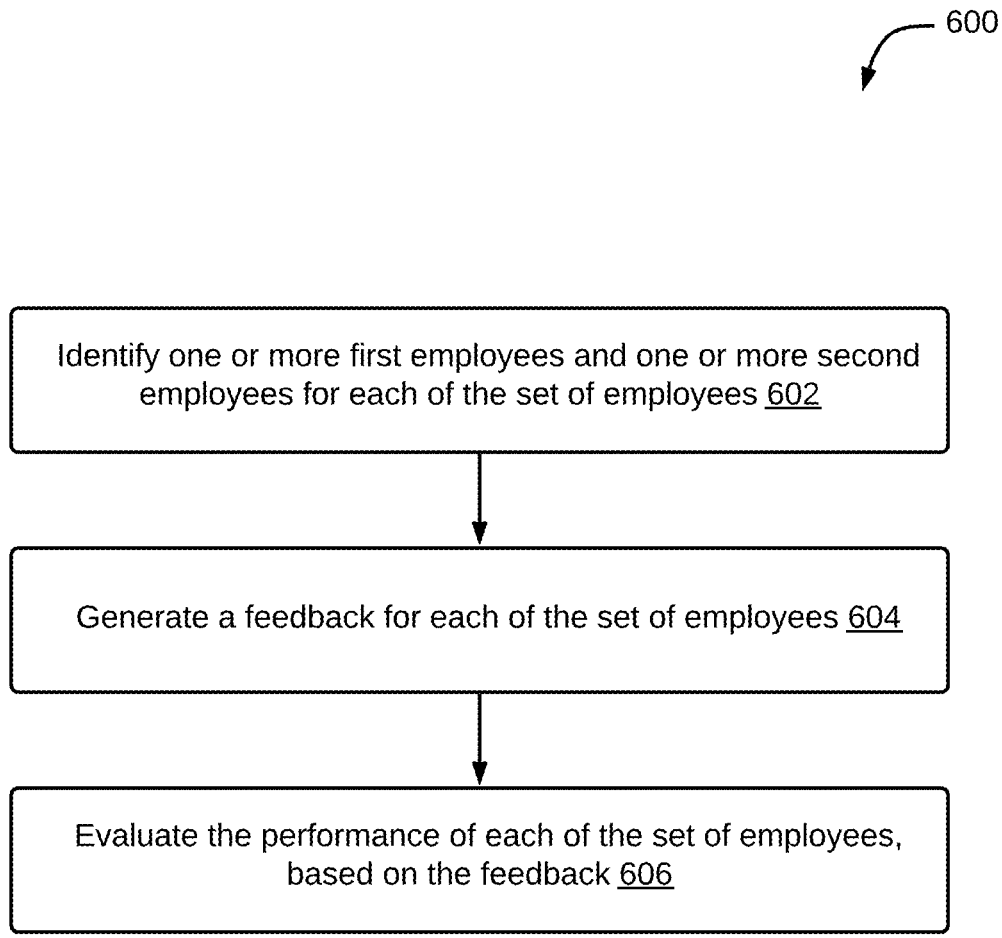
FIG. 6 illustrates a flowchart of a method evaluating performance of each of the set of employees, in accordance with an embodiment.

Referring now to FIG. 6, a flowchart of a method evaluating performance of each of the set of employees is illustrated, in accordance with an embodiment. FIG. 6 is explained in conjunction with FIG. 1 to FIG. 5.

In order to evaluate performance of each of the set of employees, at step 602, one or more first employees and one or more second employees may be identified for each of the set of employees, based on the determined degree of collaboration between at least two employees from the set of employees. In an embodiment, the one or more first employees may correspond to employees providing assistance to one or more of the set of employees. In addition, the one or more second employees may correspond to employees receive assistance from one or more of the set of employees.

Based on identification of the one or more first employees and the one or more second employees, at step 604, a feedback may be generated for each of the set of employees. In an embodiment, a positive feedback may be generated for each of the one or more first employees identified, i.e., the employees providing assistance to one or more set of employees. A negative feedback may be generated for each of the one or more second employees, i.e., the employees receiving assistance from one or more set of employees.

Further, based on the feedback generated, at step 606, performance of each of the set of employees may be evaluated. By way of an example, the one or more first employees providing assistance may be evaluated better than the one or more second employees receiving assistance.

Figure 7A:
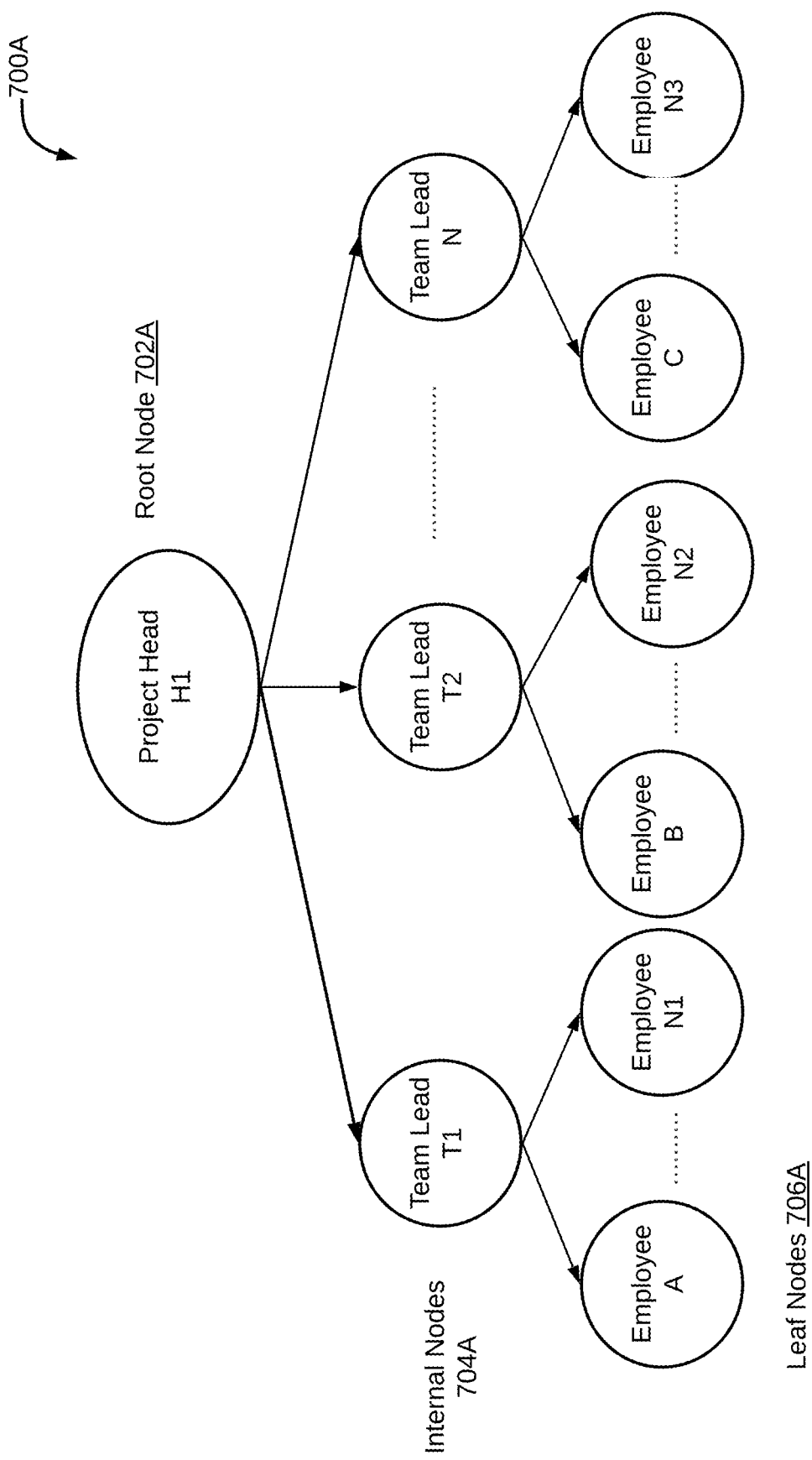
FIGS. 7A-7B depicts a pictorial representation of a hierarchical tree and an employee relationship graph for each of a set of employees, in accordance with an exemplary embodiment.
Figure 7B:
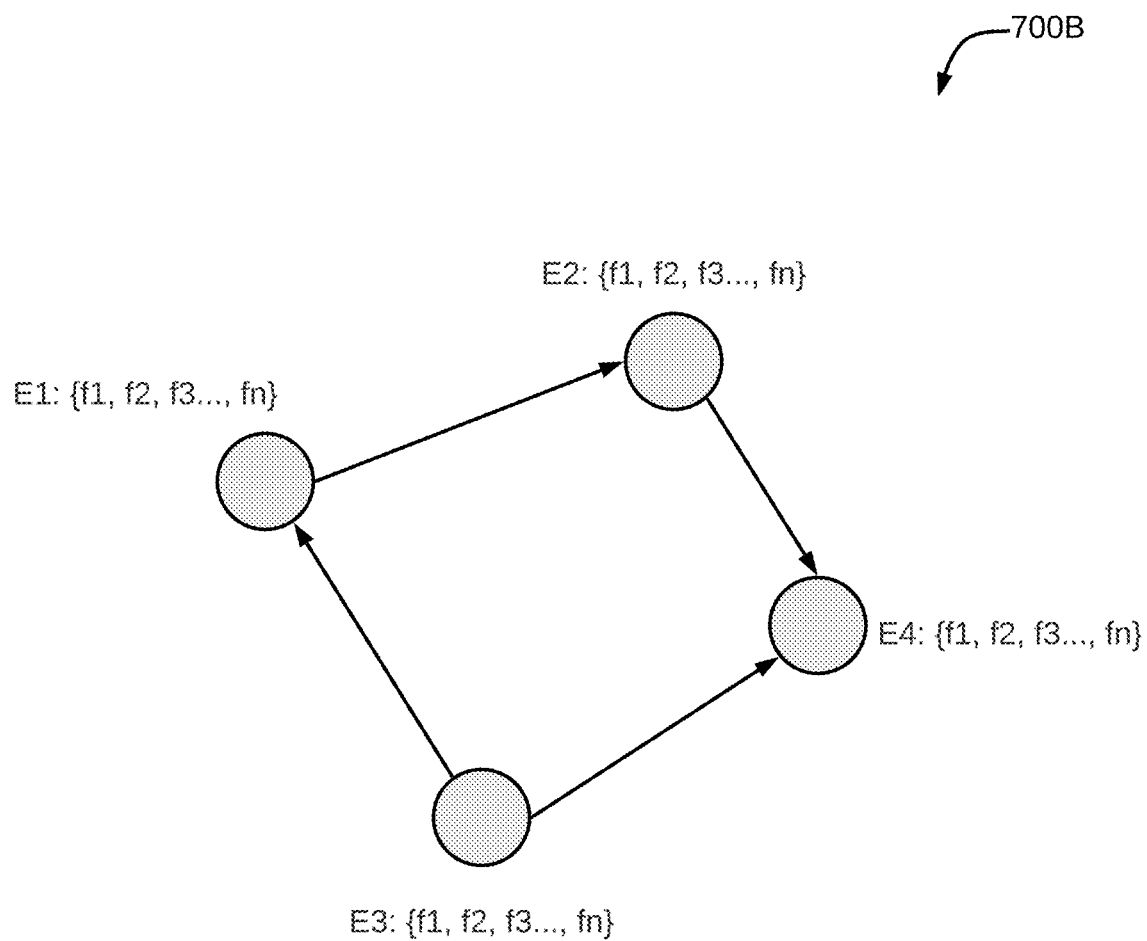

Referring now to FIG. 7A-7B, a pictorial representation of a hierarchical tree 700A and an employee relationship graph 700B for each of a set of employees is depicted, in accordance with an exemplary embodiment. FIG. 7A-7B is explained in conjunction with FIG. 1 to FIG. 6.

In FIG. 7A, the hierarchical tree 700A may consist of a root node 702a, a set of internal nodes 704a, and a set of leaf nodes 706a. By way of an example, the root node 702a may represent but not limited to, a head of project (also referred as a project head), a head of department or, a head of an organization. The set of internal nodes 704a may represent but not limited to, team leader. Each of the plurality of internal node 704a may be lower in hierarchy to the root node 702a. Further, each of the leaf nodes 706a may represent an individual employee in the organization. As will be appreciated, number of leaf nodes under each of the set of internal nodes may represent number of employees working under a particular team lead or under a particular business group. In an embodiment, each of the leaf nodes 706a may correspond to one or more first nodes. In addition, the set of internal nodes 704a may correspond to the one or more second nodes of the hierarchical tree.

In FIG. 7A, the hierarchical tree 700A may correspond to a graph that comprises two components, namely, a plurality of employee nodes and a plurality of edges. The plurality of employee nodes may include the root node 702a, the set of internal nodes 704a, and the set of leaf nodes 706a. the hierarchical tree 700A may depict some of the plurality of employees working under a respective team lead from a set of team leads of the organization.

Each of the set of team leads may be working under project head 'H1'. Further, the set of team leads working in the organization may be depicted as 'Team Lead T1', 'Team Lead T2' up to 'Team Lead N'. By way of an example, each of the plurality of employees working under 'Team Lead T1' may be depicted as 'Employee A' to 'Employee N1'. Similarly, the plurality of employees working under 'Team Lead T2' may be depicted as 'Employee B' to 'Employee N2'. Further, the plurality of employees working under 'Team Lead N' may be depicted as 'Employee C' to 'Employee N3'. It should be noted that, in the organization there may be multiple employees working under multiple different team leaders.

In an embodiment, the at least two of the plurality of employees may collaborate with one or more plurality of employees for a particular task, such as, but not limited to, developing a module for a product. For example, the employee A and the employee N1 may collaborate on a certain project. Since the employee A and the employee N1 work under the leadership of the team lead T1, the performance evaluation of the team lead T1 may be positively impacted for encouraging the collaboration between the employee A and the employee N1. In another example, the employee B and the employee C may collaborate for an assigned task. Since the employee B and the employee C work under the leadership of the team lead T2 and the team lead TN respectively, the performance evaluation of both the team lead T2 and the team lead TN may be positively impacted for encouraging the collaboration among team members (i.e., the employee B and the employee C).

Further, based on the collaboration between the team lead T2 and the team lead TN, the performance evaluation for the project head 'H1' may be positively impacted. In addition, the collaboration determined amongst the employees may facilitate identification of employees from the plurality of employees with same skillset associated with each of the set of employees. This is further explained with reference to FIG. 7B.

In FIG. 7B, there is shown an employee relationship graph 700B constructed for four employees of an organization. The employee relationship graph 700B may represent a plurality of nodes and a set of edges. In the employee relationship graph 700B, each of the plurality of nodes, namely, 'E1', 'E2', 'E3', and 'E4', may represent the four employees of the organization. Further, 'f1', 'f2', 'f3' up to 'fn' may represent a plurality of collaboration parameters associated with each of the four employees. The plurality of collaboration parameter may include, but is not limited to, at least one or more of employee skillset, employee role, employee rating, collaboration complexity, and collaboration satisfaction. Further, the edges may be directed to show directional dependencies between the nodes ('E1', 'E2', 'E3', and 'E4') based on the assistance provided or received by one of the employees from the four employees.

By way of an example, in the employee relationship graph 700B, an edge connecting two employees 'E1' and 'E2' may depict that the employee 'E1' provided the assistance to the employee 'E2' in a certain domain (such as, a machine learning domain). Hence, the employee 'E1' may receive a positive feedback and the employee 'E2' who is receiving the assistance may receive a negative feedback. Similarly, an edge connecting two employees 'E2' and 'E4' may depict that the employee 'E2' provided the assistance to the employee 'E4' on the machine learning domain. In this scenario, the employee 'E2' may be the positively impacted, while the employee 'E4' may be negatively impacted. Moreover, the employee 'E1' may also be positively impacted, based on the assistance provided by the employee 'E1' to the employee 'E2' in the machine learning domain that further helped the employee 'E2' to provide assistance to the employee 'E4'. Therefore, the employee 'E2' and the employee 'E4' may have received the assistance from the employee 'E1', where the employee 'E2' may have received the assistance directly from the employee 'E1', while the employee 'E4' may have received the assistance indirectly from the employee 'E1'.

In addition, each of the plurality of vector embeddings corresponding to each of the plurality of employee nodes may be generated based on corresponding neighboring nodes in the employee relationship graph 700B in a way similar to word or sentence embedding in Natural Language Processing (NLP) problems.

Figure 8:
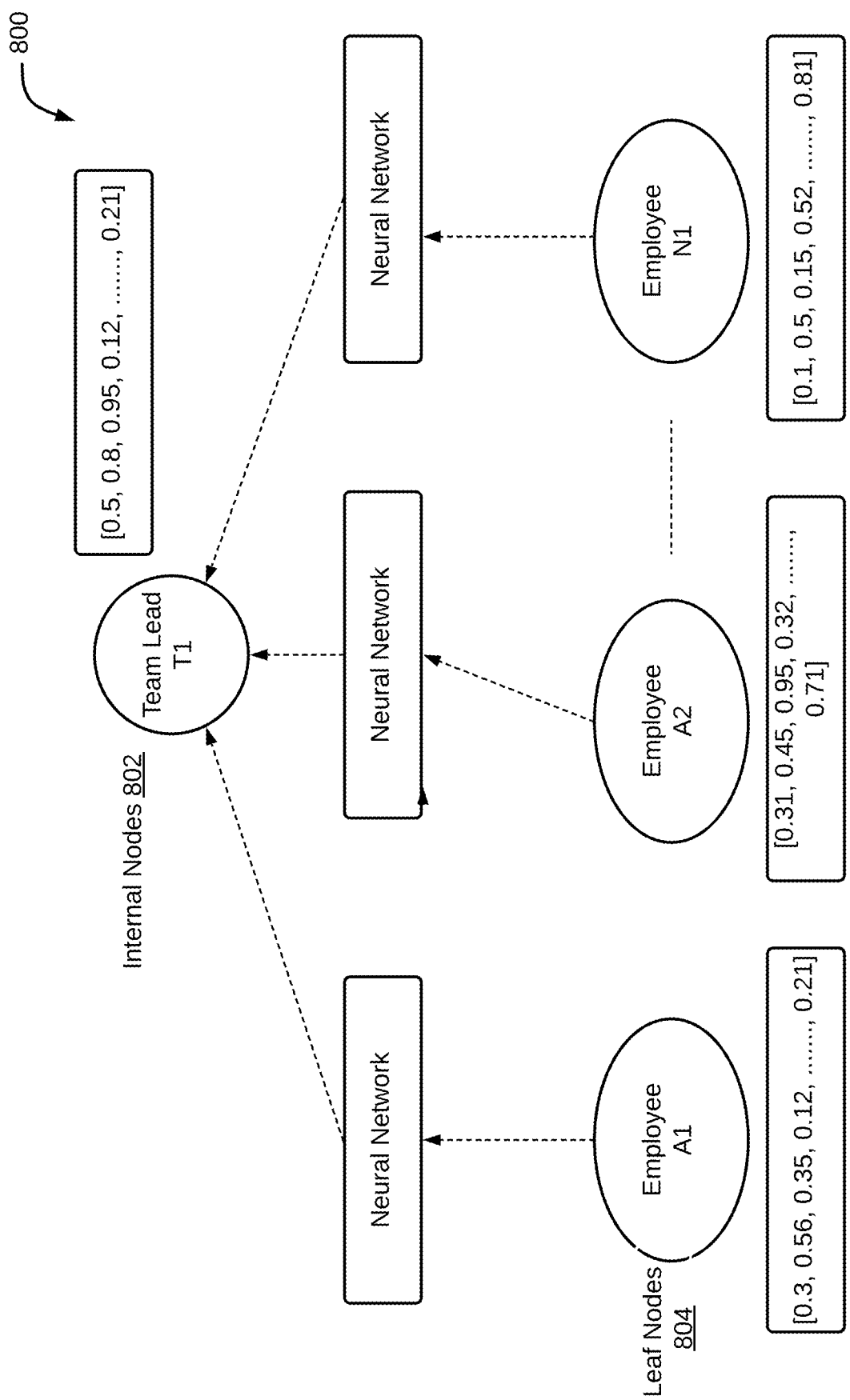
FIG. 8 depicts a plurality of vector embedding generated for a set of employees, in accordance with an exemplary embodiment.

Referring now to FIG. 8, a plurality of vector embeddings generated for a set of employees is depicted, in accordance with an embodiment. FIG. 8 is explained in conjunction to FIG. 1-7B.

In an embodiment, a sub-graph 800 of the hierarchical tree 700A is represented. The sub-graph 800 represented may depict the plurality of employees, i.e., employee 'A1', employee 'A2' up to employee 'N1', working under a team lead 'T1' 802 for a certain team. The sub-graph 800 may correspond to a subtree with nodes whose internal node 802 represents the team lead T1 (or a manager/a reviewer) and the leaf nodes 804 may represent juniors (A1 to N1) of the team lead T1. For example, team represented by the sub graph 800 may correspond to, but not limited to, a big-data team, a project management team, and a sales team.

In an embodiment, the leaf nodes 804 corresponding to A1 to N1 in the sub-graph 800 may be referred as first nodes. The internal node 802, i.e., the team lead 'T1' may be referred as a second node. The second node may be higher in hierarchy than the first nodes in the subgraph 800. In addition, a plurality of vector embeddings corresponding to the employees A1 to N1 may be generated. The plurality of vector embeddings may be generated based on each of a plurality of collaboration parameters associated with employees A1 to N1. The plurality of vector embeddings for each of the employees A1 to N1 may be indicative of the degree of collaboration among counterparts.

In accordance with an embodiment, edges between the nodes may implement Neural Network models, such as, but not limited to, feed-forward NN, and recurrent NN to populate information for nodes corresponding to superiors (such as the team lead T1). In accordance with an embodiment, the vector embeddings for the team lead 'T1' may be generated based on employees A1 to N1 working under him.

In accordance with an embodiment, the vector embeddings for the team lead 'T1' for second node may be based on the plurality of vector embeddings of the first nodes representing employees A1 to N1 and initial vector embeddings of the team lead T1 that is based on each of the collaboration parameters of the team lead T1 to generate final vector embeddings for the team lead T1. Such vector embeddings may be generated based on any neural network implementation. Examples of neural network may include, but is not limited to, Long Short-Term Memory (LSTM)-Gated Recurrent Units (GRU), LSTM, and GRU.

In accordance with an embodiment, the AI based collaboration system 102 may identify employees with same skillset from the plurality of employees based on the plurality of vector representations for each node corresponding to each of the set of employees in the organization. By way of an example, employees those have knowledge or have worked in past in a specific technological domain may collaborate in future for development of a product of that specific technological domain. Examples of technological domain may include, but is not limited to, Information Technology (IT), Machine Learning (ML), Java, Python, Project Management, and Business Development.

Figure 9:
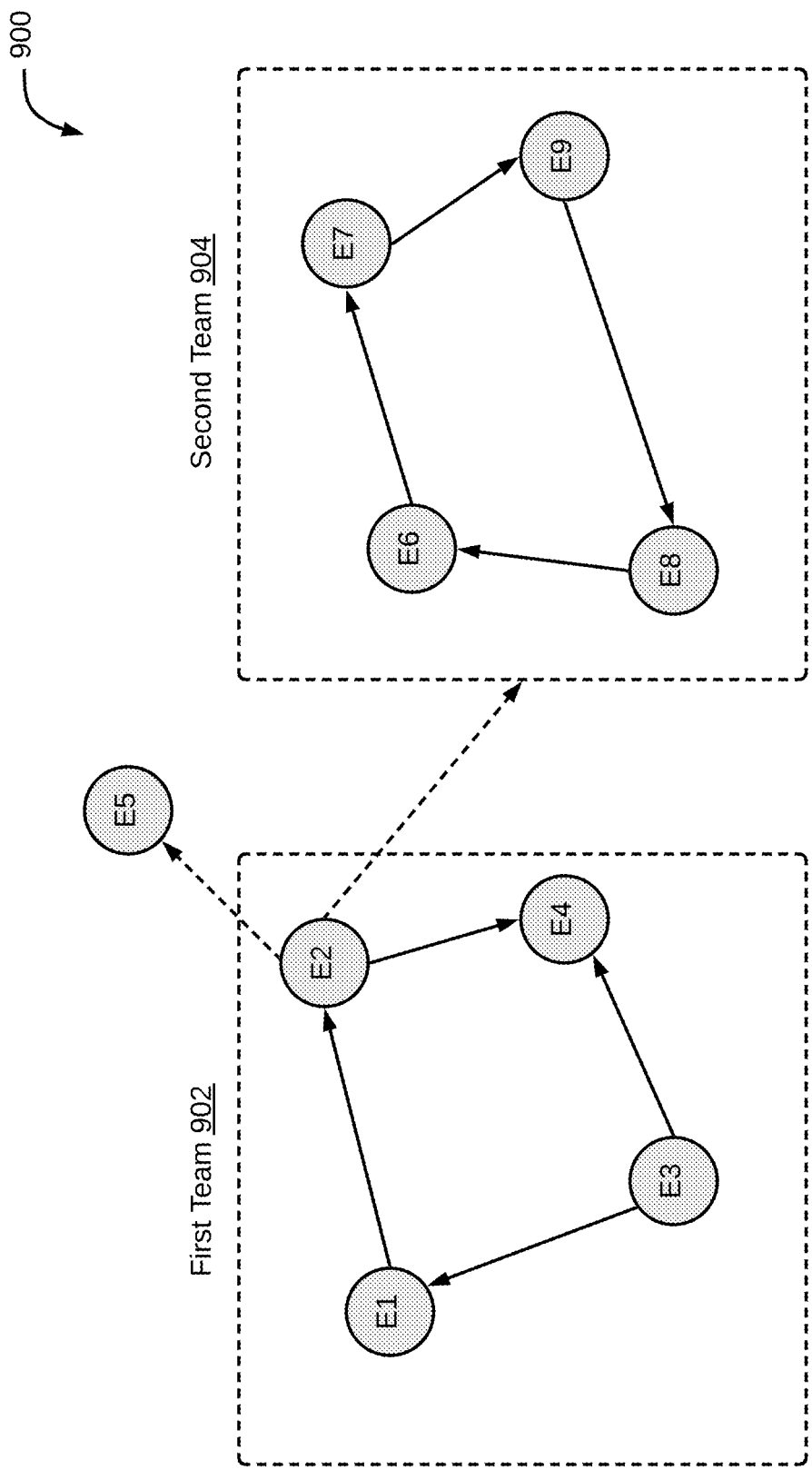
FIG. 9 depicts a scenario of collaborating a new employee with at least one of the set of employees, in accordance with an exemplary embodiment.

Referring now to FIG. 9, a scenario 900 of collaborating a new employee with at least one of the set of employees is depicted, in accordance with an exemplary embodiment. In the scenario 900, a set of two teams i.e., a first team 902 and a second team 904 in an organization is depicted. Both, the first team 902 and the second team 904 may include a set of four employees each. The set of four employees in the first team 902 may include employee 'E1', employee 'E2', employee 'E3' and employee 'E4' and hence represented by nodes E1, E2, E3 AND E4 respectively. Similarly, the set of four employees in the second team 904 may include employee 'E6', employee 'E7', employee 'E8', and employee 'E9' and hence represented by nodes E6, E7, E8 AND E9 respectively. In accordance with an exemplary embodiment, a new employee 'E5' joins the organization. In accordance with an embodiment, the AI based collaboration system 102 may identify at least one employee from the first team 902 and the second team 904 for collaboration with the new employee 'E5' for performing a task in future or for training purpose.

In order to identify the at least one employee for collaboration with the new employee 'E5', the AI based collaboration system may evaluate the plurality of collaboration parameters associated with the new employee 'E5' with the plurality of collaboration parameter associated with each of the set of four employees of the first team 902 and the second team 904. As depicted in the scenario 900, in one embodiment, based on evaluation of the plurality of collaboration parameters, the new employee 'E5' may collaborate with the employee 'E2' of the first team 902 in order to receive assistance (example: to receive assistance for training). In an embodiment, in order to identify collaboration for new employees, the AI based collaboration system 102 may use a graph based neural networks.

Referring now to FIG. 10A-10C, tabular representations of input data corresponding to the plurality of collaboration parameters is illustrated, in accordance with some exemplary embodiments of the present disclosure. FIG. 10A-10C is explained in conjunction with FIG. 1 to FIG. 9.

With reference to FIG. 10A, the tabular representation 1000A of a dataset (the input data) corresponding to the plurality of collaboration parameters for a set of employees is shown. The dataset may depict the plurality of collaboration parameters captured as the input data by the AI based collaboration system 102 for each of the set of employees in order to determine the degree of collaboration among at least two of the set of employees.

In the tabular representation 1000A, a column 1002a represents a serial number. A column 1004a represents an employee ID for each of a first set of employees from the set of employees. A column 1006a represents other employee ID associated with a second set of employees from the set of employees. In an embodiment, the first set of employees depicted via column 1004a may correspond to the one or more first employees providing assistance to one or more set. In addition, the second set of employees depicted via column 1006a may correspond to the one or more second employees receiving assistance from one or more of the set of employees.

A column 1008a represents an employee's skillset associated with each of the first set of employees. Examples for the employee's skillset may include, but is not limited to, Python, Dynamic Programming, NPL, Microsoft-Structure Query Language (MS-SQL) database, Java, and ML. In some embodiments, the tabular representation 1000A may include any combination of the employee's skillset depending upon expertise of each of the first set of employees. A column 1010a may represent a role of each of the first set of employees working in an organization either in same team or different teams. As depicted in the table 1000A, the role of employee 'E1' may be of a senior developer in the organization. Similarly, the role of employee 'E2' may be of a developer in the organization. In addition, the role of employee 'E3' may be of a data scientist in the organization. A column 1012a represents a complexity of collaboration. A column 1014a represents employees rating (also referred as ranking) associated with each of the first set of employees. A column 1016a represents a score provided based on collaboration satisfaction of the set of employees.

In an embodiment, the collaboration satisfaction may correspond to one of a successful collaboration and an unsuccessful collaboration. Moreover, the successful collaboration may be scored higher than the unsuccessful collaboration. In an embodiment, based on assistance provided by each of the first set of employees to at least one of the second set of employees, corresponding values for the column 1012a (complexity of collaboration), the column 1014a (employees rating), and the column 1016a (collaboration satisfaction) may be predicted. By way of an example, an ordinal value associated with the complexity of collaboration may correspond to low, medium, and high. Similarly, the ordinal value associated with the employees rating may correspond to a good performer, an average performer, and an excellent performer.

In addition, the ordinal values associated with the collaboration satisfaction may range from a value '1' to a value '5'. In an embodiment, the ordinal value '1' for the collaboration satisfaction may depict the unsuccessful collaboration. However, the value '5' for the collaboration satisfaction may depict the successful collaboration. The data populated in the table 1000A may not be suitable as a passable format for a graph based neural network, such as the first pre-trained machine learning model. Hence, the data populated in the table 1000A may be pre-processed by the AI based collaboration system 102 as shown in FIG. 10B.

The tabular representation 1000B may represent numerical values of the plurality of collaboration parameters captured for each of the set of employees. The AI based collaboration system 102 may be configured to convert input data with ordinal values as shown in FIG. 10A into numerical values. There is shown, Employee ID 1004b, other member ID 1006b, complexity of collaboration 1012b, employee rating 1014b, and collaboration satisfaction 1016b. As an example, column 1014 b with name "employee's rating" have values such as 1, 2 and 3 where "1" may replace "Low" and "3" may replace "High". In some other embodiments, one-hot representation (also referred as one hot embeddings) of ordinal values may be generated by the AI based collaboration system 102 where new features/columns may be introduced equal to number of unique values in original column of the tabular representation 1000A. For example, columns of collaboration parameters with multiple values (such as, Column: employee's skillset) may be converted to unique numeric values. In order to represent values numerically for the collaboration parameters, the AI based collaboration system 102 may be configured to convert such values into one-hot representation.

Further, in one-hot representation, embedding layer of the first trained machine learning model may have vector representation for a number of dimensions equal to number of unique values (T1 to T5 of 1000B) in certain column. Column 'T1', 'T2', 'T3', 'T4', and 'T5' may represent unique numerical values based on a type of technology or language in which each of the first set of employees may be skilled in). By way of an example, the collaboration parameter "employee's skillset" may be represented numerically in T1 to T5 of 1000B, such as, Python: [1 0 0 0 0 0], Java: [0 1 0 0 0 0], Machine Learning: [0 0 1 0 0 0], Natural Language Processing: [0 0 0 1 0 0], MS SQL database: [0 0 0 0 1 0] and Dynamic Programming: [0 0 0 0 0 1].

Thereafter, a graph may be constructed based on the plurality of collaboration parameters associated with the first set of employees and the assistance provided by each of the first set of employees to at least one of the second set of employees. Once the graph is constructed, a set of linked nodes may be identified from the graph. In an embodiment, each of the set of linked nodes may be based on any graph algorithm (for example: random walk). In addition, the AI based collaboration system 102 may use the graph algorithm to generate each of the plurality of vector embeddings. In some embodiment, the plurality of vector embeddings may be generated based on BERT (Bi-directional Encoder Representations from Transformer) embedding (n case of any textual feature). In addition, the BERT embeddings may be used to generate low dimensional vector representation of the nodes representing each of the set of employees in the graph.

A tabular representation 1000C represents a number of successful collaborations corresponding to each of the first set of employees. A column 1002c may represent a serial number. A column 1004c may represent employees rating. The employees rating may be based on assistance provided by each of the first set of employees to at least one of the second set of employees. A column 1006c may represent employee ID. A column 1008c may represent the number of successful collaborations of each of the first set of employees with at least one of the second set of employees. Further, based on the number of collaborations determined associated with each of the first set of employees, an employee with highest collaboration from the first set of employees may be identified.

With reference to tabular representation 1000c, it may be depicted that the employee E2 may not be an excellent performer like employees E1 and E3, however, the employee E2 may be a better collaborator as compared to the employees E1 and E3. In accordance with an embodiment, the AI based collaboration system 102 may be configured to rank employee E2 higher as compared to the employees E1 and E3, based on a number of successful collaborations (1008c) to determine a degree of collaboration between the at least two employees of an organization.

Figure 11:
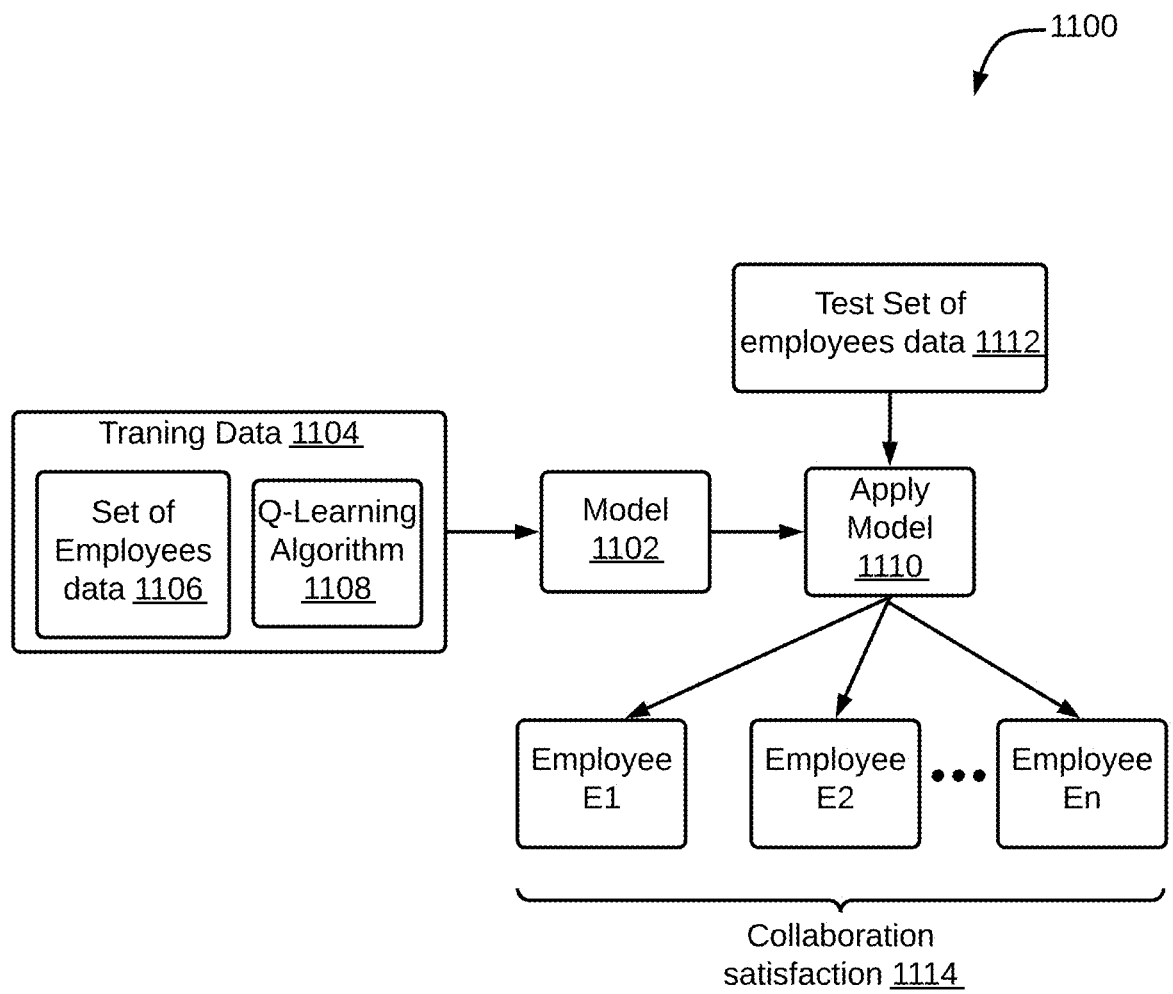
FIG. 11 illustrates an AI based collaboration system trained on a reinforcement learning approach, in accordance with an exemplary embodiment.

Referring now to FIG. 11, a trained AI based collaboration system based on a reinforcement learning is illustrated, in accordance with an exemplary embodiment. FIG. 11 is explained in conjunction with FIG. 1 to FIG. 10C.

There is shown a model 1102, training data 1104 with a set of employees' data 1106 and Q-learning algorithm 1108, apply model 1110, a test set of employees' data 1112, and employee's collaboration satisfaction ratings 1114. In accordance with an embodiment, the model 1102 may correspond to a trained collaboration system, such as the AI based collaboration system 102. In accordance with an embodiment, the model 1102 may be exposed to new training data 1104 when the model 1102 has never been through earlier training process. The model 1102 may leverage any similarity measures such as cosine similarity to find out employees with similar skillset. For example, when two employees have same years of experience and has worked on almost same level of expertise in a particular skillset then vector embeddings representation of those two employees may be near to each other in vector space.

As a result, the model 1102 may learn to identify optimal reward function that will maximize reward for end goal of identifying employee with maximum successful collaboration. In accordance with an embodiment, the set of employees' data 1106 may correspond to information associated with each of the set of employees. The information may include number of successful collaborations associated with each of the set of employees, computed score generated based on the collaboration satisfaction, the plurality of collaboration parameters, etc. Further, the Q-value algorithm 1108 may be used to calculate a Q-value corresponding to each of the set of employees. The Q-value may be calculated based on the reinforcement learning approach. In addition, the feedback associated with each of the set of employees may be predicted based on reinforcement learning approach.

In an embodiment, the Q-value represents preference of a particular employee over other employees from the set of employees across all values of the collaboration satisfaction or employee's rating. In other words, the Q-value may represent probability of one employee being preferred over the other employees across different values of the collaboration satisfaction or employee's rating. Based on the calculated Q-value, the model 1102 may penalize the team leader or the practice head for giving incorrect score for the collaboration satisfaction or employee's rating to one employee over the other employees from the set of employees. Moreover, the Q-values each of the set of employees along with the associated collaboration satisfaction or employee's rating may be used to maximize reward.

Based on the training data 1104 received, the model 1110 may be generated for a test set of employees' data 1112. The test set of employees' data may correspond to information associated with a new set of employees. The score provided for the collaboration satisfaction to each of the test set of employees' data may be depicted as collaboration satisfaction 1114. With reference to the FIG. 1, the first pre-trained machine learning model corresponds to a Q network. The Q network may be configured to receive as input an input observation corresponding to set of employees' data and an input action and to generate an estimated future reward (or penalty) from the input in accordance with each of the plurality of collaboration parameters associated with the set of employees.

Figure 12:
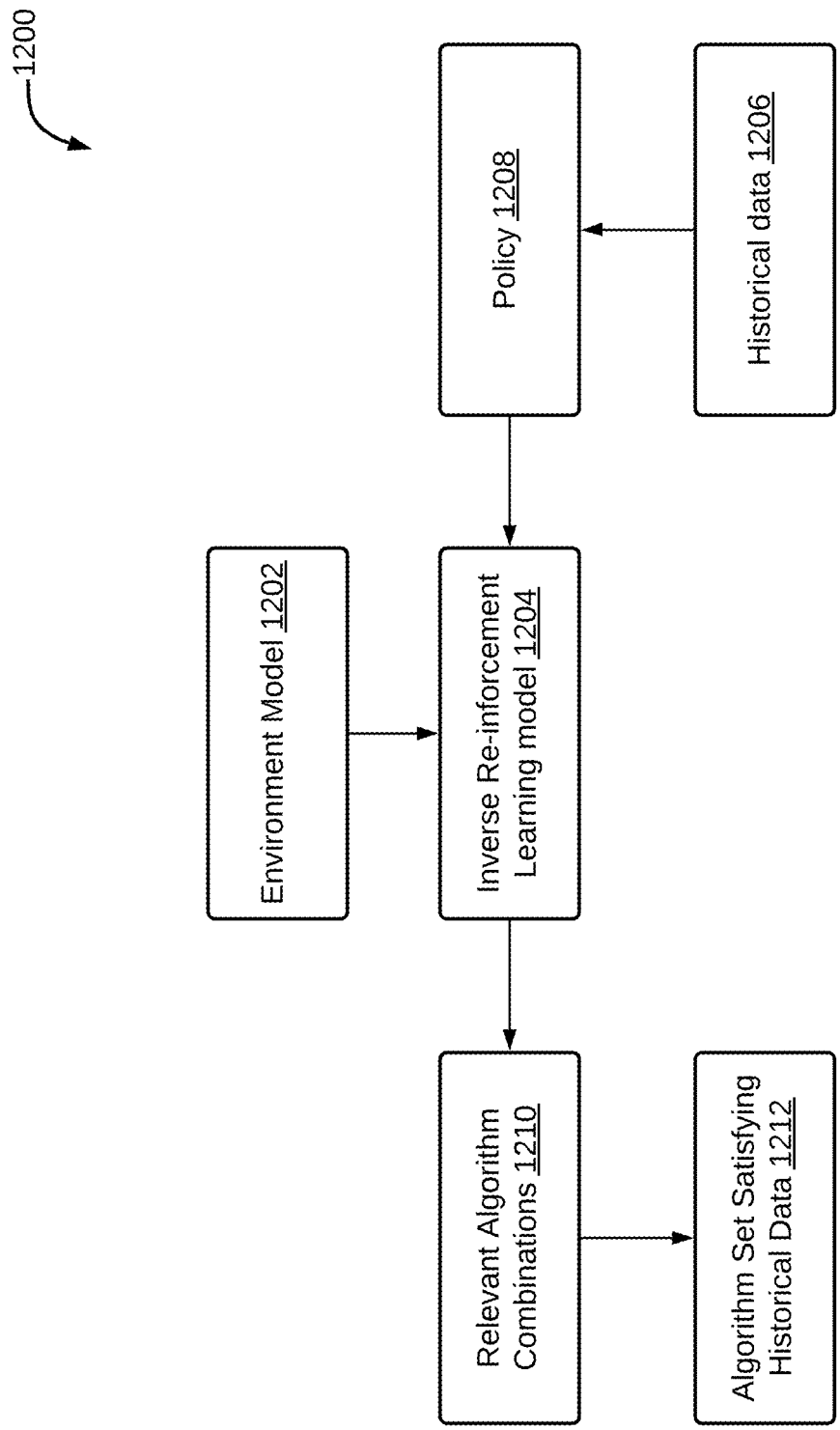
FIG. 12 illustrates a collaboration system that uses inverse reinforcement learning to perform hyperparameter tuning, in accordance with an exemplary embodiment.

Referring now to FIG. 12, a trained collaboration system that uses inverse reinforcement learning is illustrated, in accordance with an exemplary embodiment. FIG. 12 is explained in conjunction with FIG. 1 to FIG. 11. There is shown an environmental model 1202, an inverse reinforcement learning model 1204, historical data 1206, policy 1208, relevant algorithm combinations 1210, and algorithm set satisfying historical data 1212.

The reinforcement learning based trained collaboration system may correspond to the environment model 1202. The environment model 1202 may correspond to the apply model 1210. The environment model 1202 may employ the inverse reinforcement learning model 1204. The inverse reinforcement learning model 1204 may be configured to utilize the historical records 1206 to penalize and boost chances of an employee or team of an organization to be considered for future collaboration. The historical records 1206 may use various policies, such as the policy 1208 to penalize and boost chances of an employee or team to be considered for future collaboration.

In an embodiment, the historical records 1206 may include detailed information about each of the set of employees from various teams in an organization along with the assistance provided by one employee to another employee in same team or different team. Thereafter, the inverse reinforcement learning model 1204 may identify combination or set of algorithms and function that will define architecture of deep learning based recurrent neural network variations and define hyperparameter for different layers of a neural network. The combination or set of algorithms and function may be represented as relevant algorithm combination 1210. In an embodiment, the inverse reinforcement learning model 1204 may recommend more than one combination of set of algorithms and functions.

Further, the recommended combination of set of algorithms and functions may be evaluated based on the reinforcement learning approach in order to accept one combination of set of algorithms and functions. Moreover, one combination of set of algorithms and functions may be accepted when it satisfies evaluation of historical records represented as algorithm set satisfying historical records 1212. Once the one combination of set of algorithms and functions is accepted, a new environment may be created for the environment model 1202. In addition, the inverse reinforcement learning model 1204 may recommend optimal values of hyperparameters corresponding to each combination of set of algorithms and functions. Further, the optimal values of hyperparameters may be validated against historical data received from an existing environment of the environment model 1202. This process is known as model hyperparameter tuning.

Figure 13:
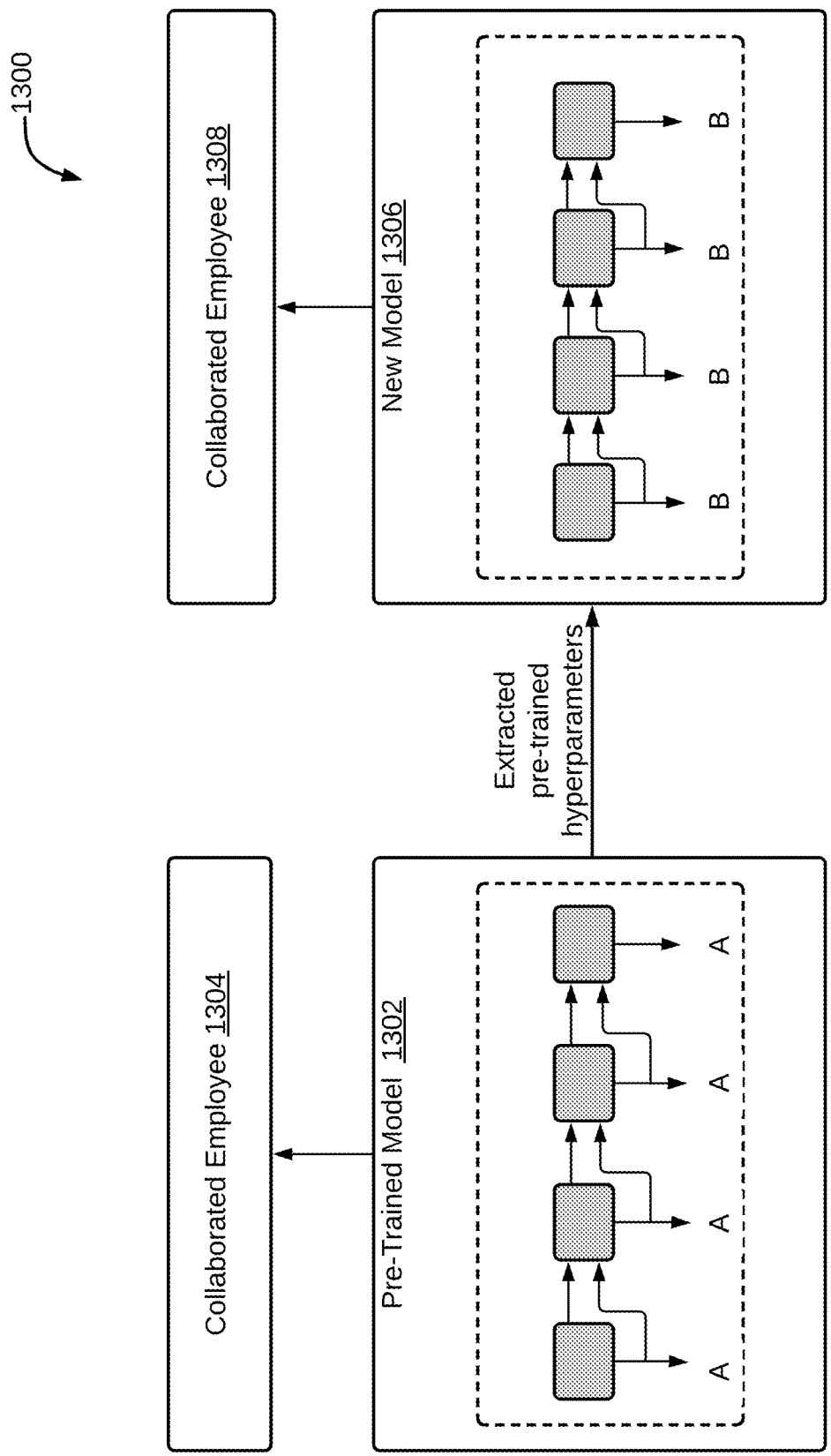
FIG. 13 illustrates a transfer learning approach to create a new environment for an AI based collaboration system, in accordance with an exemplary embodiment.

Referring now to FIG. 13, a transfer learning approach to create a new environment for an AI based collaboration system is depicted, in accordance with an exemplary embodiment. FIG. 13 is explained in conjunction with FIG. 1 to FIG. 12. There is shown a pre-trained model 1302, a set of collaborated employees 1304 associated with the pre-trained model 1302, a new model 1306, and a set of collaborated employees 1308 associated with the new model 1306.

In an embodiment, the transfer learning approach may be used to leverage training of an AI based collaboration system (such as, the AI based collaboration system 102) from previous implementation to new implementation. The new model 1306 may correspond to the new environment generated for the environment model 1202 based on acceptance of one combination of the set of algorithms and functions. The new model 1306 may receive the optimal values of hyperparameters represented as extracted pre-trained hyperparameters from the pre-trained model 1302.

Thereafter, the new model 1306 may identify a degree of collaboration between at least two employees from the set of employees based on the optimal values of hyperparameters received from the pre-trained model 1302. In an embodiment, the transfer learning approach may enable gathering of knowledge from an existing environment or implementation of the AI based collaboration system 102. The knowledge corresponds to optimal values (i.e., the plurality of vector embeddings) of the plurality of collaboration parameters and hyperparameter required for the implementation of the AI based collaboration system 102. Further, the optimal values of the plurality of collaboration parameters and hyperparameter may be utilized to develop the new environment for the AI based collaboration system 102. This may require less training time as compared to starting from scratch or from vanilla model. The vanilla model may correspond to a standard, usual, and unfeatured version of the AI based collaboration system 102.

In accordance with an embodiment, the AI based collaboration system 102 may be configured to modify the first pre-trained machine learning model (such as, the environment model 1202) with transferable knowledge for a target system to be evaluated. The transferable knowledge may correspond to optimal values associated with the plurality of vector embeddings corresponding to each of the plurality of collaboration parameters.

In accordance with an embodiment, the AI based collaboration system 102 may be configured to tune the first pre-trained machine learning model (such as, the pre-trained model 1302) using specific characteristics of the target system to create a target model (such as, the new model 1306). In accordance with an embodiment, the AI based collaboration system 102 may be configured to evaluate the target system performance using the target model (such as, the new model 1306) to predict system performance of the target system for determining the degree of collaboration among at least two employees from the set of employees working in an organization.

Further, the AI based collaboration system 102 may enable a plurality of employees working in an organization to leverage its usage. In certain other scenario, an employee from a set of employees who needs help or assistance from other employees may leverage the AI based collaboration system 102. By way of an example, the employee may ask query like "Can you help me to find out developer who is an expert in machine learning?" via a user interface 110 of the AI based collaboration system 102. As a response, the AI based collaboration system 102 may connect the employee via REST API (Representational State Transfer Application Programming Interface) to get details of employee and render/display response using the I/O devices 108.

Various embodiments provide a method and system for determining collaboration between employees. The disclosed method and system may receive a plurality of collaboration parameters associated with a set of employees. The system and method may then create a plurality of employee nodes associated with the set of employees in a hierarchical tree. The plurality of employee nodes may be created based on the plurality of collaboration parameters and a first pre-trained machine learning model. Further, the system and the method may generate a plurality of vector embeddings associated with the plurality of employee nodes, based on the first pre-trained machine learning model. Thereafter, the system and the method may determine a degree of collaboration between at least two employees from the set of employees based on one or more vector embeddings from the generated plurality of embeddings.

The system and method provide some advantages like the disclosed system and the method may provide an AI based collaboration system for determining collaboration between employees of any roles in an organization. The AI based collaboration system may enable organization for efficient utilization of resources. Further, the disclosed AI based collaboration system may utilize the collaboration, or the assistance information associated with employees to provide rating for performance evaluation to each employee working in the organization. This may boost resource management and improve the overall performance and productivity of different teams working in the organization. In addition, the AI based collaboration system may facilitate working of the organization much more efficiently because of the collaboration. Also, resources associated with handling of collaboration task manually, may be available for other tasks. Moreover, the disclosed AI based collaboration system may enable team leader or practice head to find employee of particular skillset due to unplanned absence of a particular employee.

It will be appreciated that, for clarity purposes, the above description has described embodiments of the disclosure with reference to different functional units and processors. However, it will be apparent that any suitable distribution of functionality between different functional units, processors or domains may be used without detracting from the disclosure. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present disclosure has been described in connection with some embodiments, it is not intended to be limited to the specific form set forth herein. Rather, the scope of the present disclosure is limited only by the claims. Additionally, although a feature may appear to be described in connection with particular embodiments, one skilled in the art would recognize that various features of the described embodiments may be combined in accordance with the disclosure. Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method determining collaboration between employees, the method comprising:
  receiving, by an AI based collaboration system, a plurality of collaboration parameters associated with a set of employees;
  creating, by the AI based collaboration system, a hierarchical tree comprising a plurality of employee nodes associated with the set of employees, based on the plurality of collaboration parameters and a first pre-trained machine learning model, wherein the hierarchical tree further comprises a plurality of edges and each of the plurality of edges interconnects at least two of the set of employee nodes;
  generating, by the AI based collaboration system, a plurality of vector embeddings associated with the plurality of employee nodes, based on the first pre-trained machine learning model; and
  determining, by the AI based collaboration system, a degree of collaboration between at least two employees from the set of employees based on one or more vector embeddings from the generated plurality of embeddings, wherein the degree of collaboration corresponds to association between the at least two employees, and wherein the first pre-trained machine learning model is configured to compute a Q value of each of the set of employees using a reinforcement learning algorithm, and wherein the Q value corresponds to probability of one employee from the set of employees being preferred over other employees from the set of employees for the collaboration.

2. The method of claim 1, wherein the plurality of collaboration parameters associated with the set of employees comprises at least one or more of employee skillset, employee role, employee rating, collaboration complexity, and collaboration satisfaction.

3. The method of claim 2, wherein determining the degree of collaboration between the at least two employees from the set of employees comprises:
  computing a score for each of the set of employees based on the collaboration satisfaction using a second pre-trained machine learning model, wherein the collaboration satisfaction corresponds to one of a successful collaboration and an unsuccessful collaboration, and wherein the successful collaboration is scored higher than the unsuccessful collaboration; and
  ranking each of the set of employees based on the associated computed score to determine the degree of collaboration between the at least two employees.

4. The method of claim 1, wherein generating the plurality of vector embeddings comprises extracting one or more set of edges initiating from a root node of the plurality of the employee nodes and culminating at an associated leaf node of the plurality of the employee nodes in the hierarchical tree.

5. The method of claim 1, further comprising:
  identifying one or more first employees and one or more second employees for each of the set of employees, wherein the one or more first employees provide assistance to one or more of the set of employees and the one or more second employees receive assistance from one or more of the set of employees;
  generating a feedback for each of the set of employees, wherein a positive feedback is generated in response to identifying the one or more first employees and a negative feedback is generated in response to identifying the one or more second employees; and
  evaluating the performance of each of the set of employees, based on the feedback.

6. The method of claim 1, wherein generating the plurality of vector embeddings comprises:
  generating one or more first vector embeddings of the plurality of vector embeddings corresponding to one or more first nodes;
  generating one or more second vector embeddings of the plurality of vector embeddings corresponding to one or more second nodes, based on aggregation of the generated one or more first vector embeddings and a third pre-trained machine learning model, and wherein the one or more first nodes are lower in hierarchy than the one or more second nodes in the hierarchical tree; and
  identifying a set of linked nodes from the one or more first nodes and the one or more second nodes, wherein the set of linked nodes correspond to a required team for collaboration.

7. The method of claim 1, wherein each node of the plurality of employee nodes corresponds to employee data associated with the plurality of collaboration parameters, and wherein each of the plurality of edges interconnecting the at least two of the set of employee nodes corresponds to relationship between two or more employees of the set of employees of various designations.

8. The method of claim 1, wherein the first pre-trained machine learning model is trained as part of transfer learning to determine the degree of collaboration between the at least two employees.

9. A system for determining collaboration between employees, the system comprising:
  a processor; and
  a memory communicatively coupled to the processor, wherein the memory stores processor executable instructions, which, on execution, causes the processor to:
  receive a plurality of collaboration parameters associated with a set of employees;
  create a hierarchical tree comprising a plurality of employee nodes associated with the set of employees, based on the plurality of collaboration parameters and a first pre-trained machine learning model, wherein the hierarchical tree further comprises a plurality of edges and each of the plurality of edges interconnects at least two of the set of employee nodes;
  generate a plurality of vector embeddings associated with the plurality of employee nodes, based on the first pre-trained machine learning model; and
  determine a degree of collaboration between at least two employees from the set of employees based on one or more vector embeddings from the generated plurality of embeddings, wherein the degree of collaboration corresponds to association between the at least two employees, and wherein the first pre-trained machine learning model is configured to compute a Q value of each of the set of employees using a reinforcement learning algorithm, and wherein the Q value corresponds to probability of one employee from the set of employees being preferred over other employees from the set of employees for the collaboration.

10. The system of claim 9, wherein the plurality of collaboration parameters associated with the set of employees comprises at least one or more of employee skillset, employee role, employee rating, collaboration complexity, and collaboration satisfaction.

11. The system of claim 10, wherein the processor executable instructions cause the processor to determine the degree of collaboration between the at least two employees from the set of employees by:
   computing a score for each of the set of employees based on the collaboration satisfaction using a second pre-trained machine learning model, wherein the collaboration satisfaction corresponds to one of a successful collaboration and an unsuccessful collaboration, and wherein the successful collaboration is scored higher than the unsuccessful collaboration; and
   ranking each of the set of employees based on the associated computed score to determine the degree of collaboration between the at least two employees.

12. The system of claim 9, wherein the processor executable instructions cause the processor to generate the plurality of vector embeddings by extracting one or more set of edges initiating from the root node of the plurality of the employee nodes and culminating at an associated leaf node of the plurality of the employee nodes in the hierarchical tree.

13. The system of claim 9, wherein the processor executable instructions cause the processor to:
   identify one or more first employees and one or more second employees for each of the set of employees, wherein the one or more first employees provide assistance to one or more of the set of employees and the one or more second employees receive assistance from one or more of the set of employees;
   generate a feedback for each of the set of employees, wherein a positive feedback is generated in response to identifying the one or more first employees and a negative feedback is generated in response to identifying the one or more second employees; and
   evaluate the performance of each of the set of employees, based on the feedback.

14. The system of claim 9, wherein the processor executable instructions cause the processor to generate the plurality of vector embeddings by:
   generating one or more first vector embeddings of the plurality of vector embeddings corresponding to one or more first nodes;
   generating one or more second vector embeddings of the plurality of vector embeddings corresponding to one or more second nodes, based on aggregation of the generated one or more first vector embeddings and a third pre-trained machine learning model, and wherein the one or more first nodes are lower in hierarchy than the one or more second nodes in the hierarchical tree; and
   identifying a set of linked nodes from the one or more first nodes and the one or more second nodes, wherein the set of linked nodes correspond to a required team for collaboration.

15. The system of claim 9, wherein each node of the plurality of employee nodes corresponds to employee data associated with the plurality of collaboration parameters, and wherein each of the plurality of edges interconnecting the at least two of the set of employee nodes corresponds to relationship between two or more employees of the set of employees of various designations.

16. The system of claim 9, wherein the first pre-trained machine learning model is trained as part of transfer learning to determine the degree of collaboration between the at least two employees.

17. A non-transitory computer-readable medium storing computer-executable instructions for determining collaboration between employees, the stored instructions, when executed by a processor, cause the processor to perform operations comprising:
   receiving a plurality of collaboration parameters associated with a set of employees;
   creating a hierarchical tree comprising a plurality of employee nodes associated with the set of employees, based on the plurality of collaboration parameters and a first pre-trained machine learning model, wherein the hierarchical tree further comprises a plurality of edges and each of the plurality of edges interconnects at least two of the set of employee nodes;
   generating a plurality of vector embeddings associated with the plurality of employee nodes, based on the first pre-trained machine learning model; and
   determining a degree of collaboration between at least two employees from the set of employees based on one or more vector embeddings from the generated plurality of embeddings, wherein the degree of collaboration corresponds to association between the at least two employees, and wherein the first pre-trained machine learning model is configured to compute a Q value of each of the set of employees using a reinforcement learning algorithm, and wherein the Q value corresponds to probability of one employee from the set of employees being preferred over other employees from the set of employees for the collaboration.

* * * * *